United States Patent [19]

Trundle et al.

[11] Patent Number: 4,959,192
[45] Date of Patent: Sep. 25, 1990

[54] NOZZLE DAM TRANSLOCATING SYSTEM

[75] Inventors: Mark H. Trundle, Signal Mountain, Tenn.; William C. Jones, Tunnel Hill, Ga.

[73] Assignee: Tennesse Valley Authority, Muscle Shoals, Ala.

[21] Appl. No.: 365,641

[22] Filed: Jun. 13, 1989

[51] Int. Cl.$^5$ .............................................. G21C 19/00
[52] U.S. Cl. .................................... 376/260; 376/204; 29/726
[58] Field of Search ............... 376/260, 204, 203, 277, 376/463; 29/906, 723, 726, 157.4, 157 R, 157 C, 428; 165/71, 76, 11.2; 138/89, 93; 122/379; 220/232, 233; 49/477, 506; 277/1, 135; 254/413, 415, 389

[56] References Cited

U.S. PATENT DOCUMENTS

| | | | |
|---|---|---|---|
| 4,265,011 | 5/1981 | Lebouc | 29/723 |
| 4,643,472 | 2/1987 | Schukei et al. | 294/906 |
| 4,649,019 | 3/1987 | Jawar | 376/316 |
| 4,671,326 | 6/1987 | Wilhelm et al. | 376/204 |
| 4,684,491 | 8/1987 | Rylatt | 376/204 |
| 4,777,008 | 10/1988 | Shirasu | 376/204 |

*Primary Examiner*—Daniel D. Wasil
*Attorney, Agent, or Firm*—Robert A. Petrusek

[57] ABSTRACT

The present invention relates to a system, teaches a technique, and provides apparatus eminently useful for the installation/removal, from a remote and protected location, of nozzle dams onto and from nozzle holddown rings within the channel heads of certain steam generators, including the types typically used in conjunction with the operation of pressurized hot-water nuclear power plants. The technique or method of the instant invention involves methodology for remotely introducing usually with the aid of tackle insertion tool means, through an open channel head manway requisite tubesheet tackle means, or tackle means, as well as strapping means and the securing of same therein; inserting through said open manway, usually with the aid of lifting means, folded nozzle dam means; opening said dam means and properly orientating same relative to said nozzle holddown ring; inserting, orientating, and securing the center portion of said nozzle dam means, torquing bolting means to predetermined limits; and removing from said channel head all said attendant tubesheet tackle means. The effecting of the instant technique requires only a minimal amount of relatively inexpensive, but specially designed equipment and is simply, quickly, and easily placed into practice by, for example, manipulation of same by one or more human operators who are physically located outside said channel head(s) and adjacent said open manway thereby substantially reducing the effective radiation dose heretofore normally associated with such nozzle dam installation and removal.

9 Claims, 13 Drawing Sheets

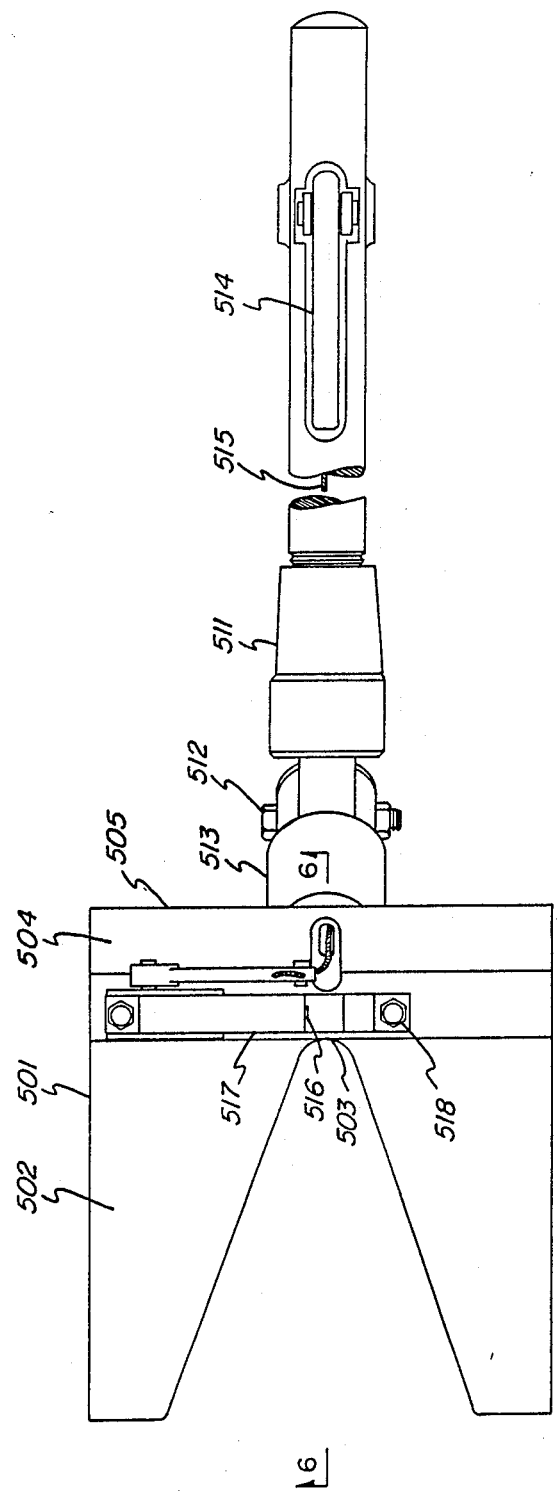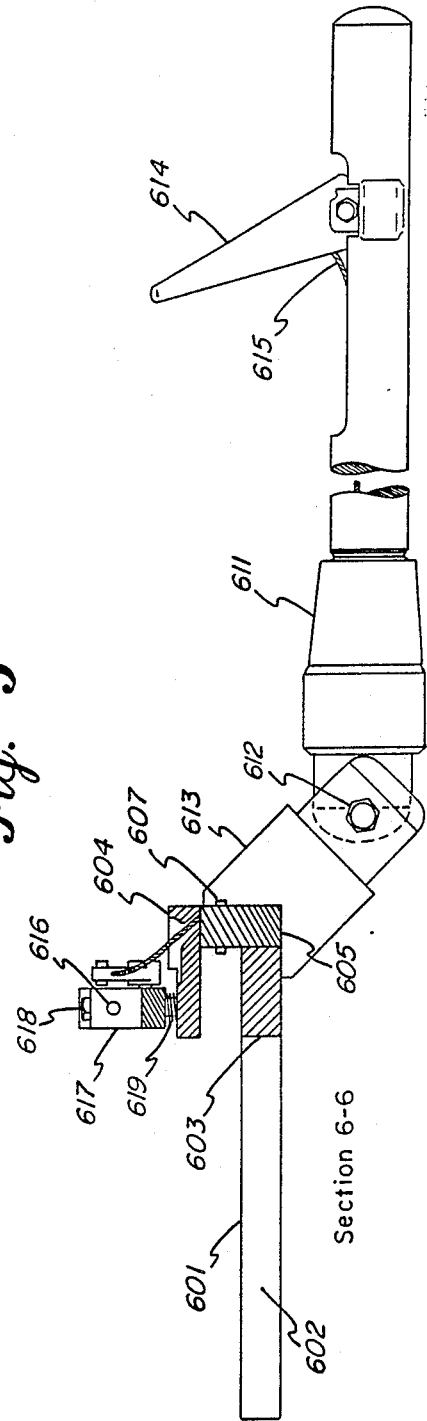

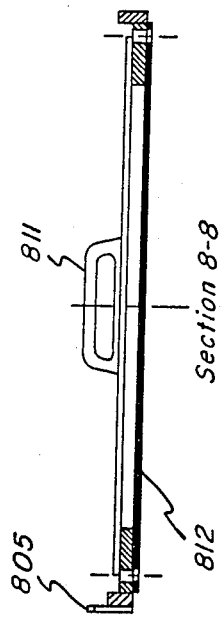
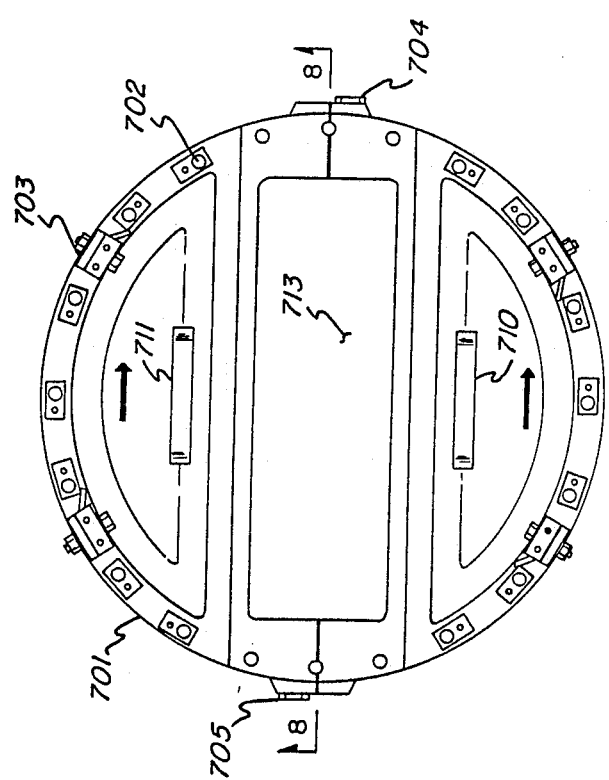
Fig. 8
Fig. 7

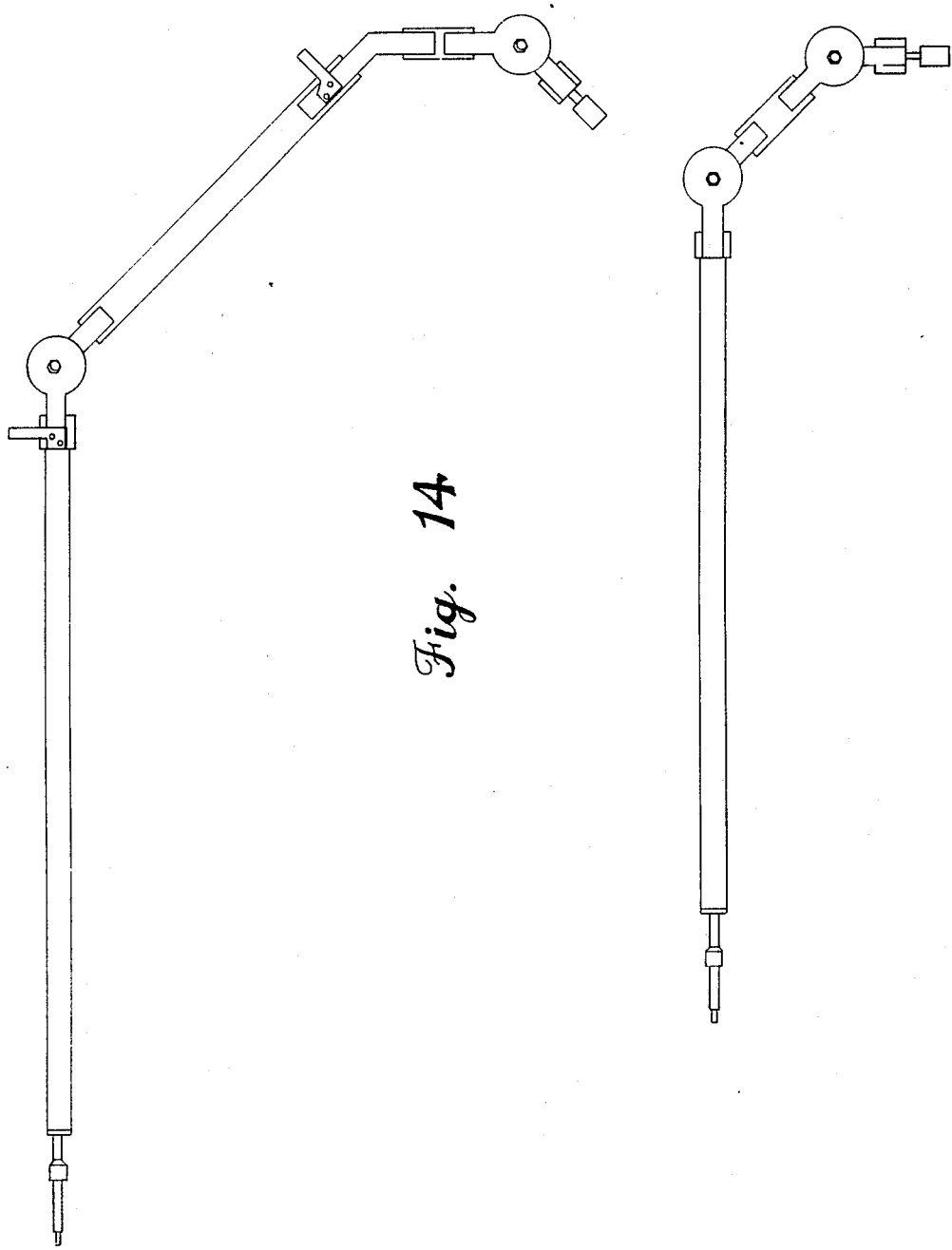

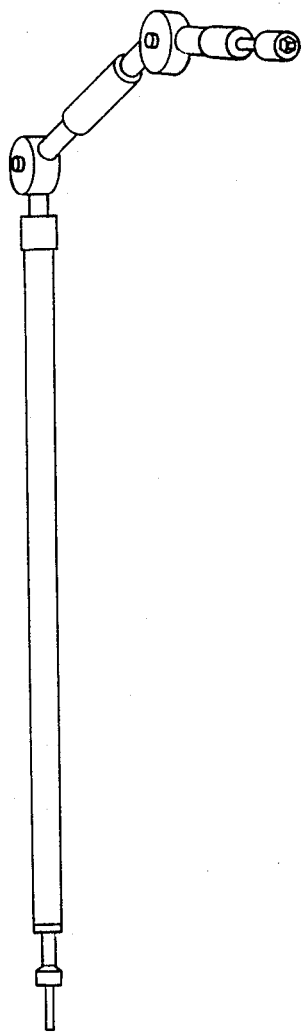

NOZZLE DAM TRANSLOCATING SYSTEM

The invention herein described may be manufactured and used by or for the Government for governmental purposes without the payment to us of any royalty therefor.

INTRODUCTION

The present invention relates to a new, novel, and relatively simple and inexpensive, as well as highly efficient and safe technique or method, as well as to specially designed apparatus for effecting the practice thereof for the remote installation and the removal of nozzle dams onto and from the nozzle holddown ring(s) which are located within the channel heads of certain steam generators, including the types typically used in conjunction with the operation of pressurized hot-water nuclear power plants.

As used herein, "remote" or "remotely" means, refers to, and/or relates to one or more activities or operations conducted within the confines of such channel head(s) by means of the manipulation of means, including specifically designed apparatus and/or tooling, at least a portion of which is operatively associated and/or coupled with, directly or indirectly, drive means including human operators, predisposed, in whole or at least substantially in part, outside the confines of such channel head(s).

It will be appreciated that the channel head area wherein a substantial portion of the instant invention is to be practiced and utilized is highly radioactive. It will also be appreciated by all those skilled in this particular art, that prior to the advent of the present invention, the installation, as well as the removal, of such nozzle dams was by means of procedures which mandated the entry and presence of a human operator in such channel head areas. A single worker is permitted to stay in such an area for only a very short time, i.e., less than two or three minutes and preferably about 30 seconds, during which he or she is exposed to a substantial portion of his/her three-month radiation dose limit. Thusly, it can be appreciated that any method and/or means which can save even a few moments from exposure to such an environment is quite valuable. It can be further appreciated that methodology and means of the type herein described, which not only allows for the substantial reduction of human exposure to such adverse environment, but which provides means and allows for the effecting of installation or removal of such nozzle dams without the need for entry and/or presence of a human operator therein has substantial utility as well as considerable safety implications. The technique, method, means, and system of the instant invention provides for establishment of suitable lifting means such as, for example, a winch and an attendant rope, said rope preferably being already threaded through a pulley assembly mounted on a later-mentioned tubesheet tackle means and, said winch being attached to stand means, said stand means adapted for rapid fastening to the grating juxtaposed the steam generator platform, at requisite and predetermined grade location outside and generally juxtaposed said channel head, preferably prior to introducing through an open channel head manway the necessary tubesheet tackle means and the remote securing of same, in the preferred embodiment, to the tubesheet. Such tubesheet generally defines the uppermost boundary of a typical channel head and further generally comprises a substantially horizontal plane. Such tubesheets typically are devoid of any suitable attachment arrangement, and therefore normally require the use of a device for attaching to the inside of one or more of the tubes associated with said sheet. Suitable tubesheet tackle means, as will be described in greater detail, infra, are introduced through said manway. After location of the proper situs, with the aid of a tube marking pole inserted from outside said manway, followed by the remote establishment onto the tubesheet of such tubesheet tackle means with the aid of a tubesheet tackle means insertion tool (hereinafter oftentimes referred to simply as tackle insertion tool), suitable nozzle dam lifting means (hereinafter oftentimes simply referred to as strapping means) which will be operatively associated with said nozzle dam, is inserted through said open manway, followed by the folded nozzle dam means or, more preferably, the strapping means are attached to the nozzle dam and the resulting combination is introduced through the manway. It will be understood from the more detailed description, infra, that certain adjustments to said nozzle dam may be necessary both prior to and subsequent to the insertion thereof. Said nozzle dam strapping means, now properly secured to the still folded nozzle dam, is then urged upwardly, by means of a lifting rope or the like, from a remote location outside the channel head to effect the subsequent opening of said nozzle dam means and translocation of same to the nozzle holddown ring. The proper orientation of the nozzle dam is effected, with the aid of a later described nozzle dam rotation tool and alignment pin tool or video camera, relative to said nozzle holddown ring. As in other operations, supra, both the nozzle dam rotation tool and the alignment pin tool or video camera are manipulated, through the open manway, by operator(s) who are located outside said channel head. At this stage of practice of the instant invention, the now properly aligned nozzle dam is at least temporarily secured to the nozzle holddown ring with the aid of a bolt starting tool which is preferably provided with motorized drive means, which drive means, in one embodiment of the instant invention, was in the form of a ⅜-inch hand-held electric drill. The inserting, orientating, and securing of a center portion of said nozzle dam means, as is contemplated in the main embodiment of the instant invention, is accomplished with the aid of the strapping means, supra, as well as with the use of appropriate hook pole means, and bolt starting tool means. Although not a direct development of the various tooling and procedures specifically developed for the practice of the instant invention, the subsequent torquing of all the bolting means to predetermined limits, can either be performed manually or in the preferred embodiment by inserting into the channel head and properly positioning, orientating, and affixing a remote or robotistic bolt torquing device such as, for example, a Framatome Torquing machine. Subsequently, all of said attendant tubesheet tackle means, together with other tooling means need to be removed therefrom so that the channel head may be ready for various testing while other portions of the system are at least partial refilled with reactor coolant water. NOTE: Any references made herein to materials and/or apparatus which are identified by means of trademarks, trade names, etc., are included solely for the convenience of the reader and are not intended as or to be construed an endorsement of said materials and/or apparatus.

BACKGROUND OF THE INVENTION

1. Field of the Invention

The present invention relates to methods and means for the remote installation and/or removal of nozzle dams onto and from nozzle holddown rings within the channel heads of the type of steam generators typically used in conjunction with the operation of nuclear power plants. The instant invention relates to methodology, together with specially designed tooling, for remotely introducing through an open channel head manway tubesheet tackle means and the securing of same therein, followed by inserting through said open manway a folded nozzle dam, and thereafter causing the opening of said dam together with the proper translocation, orientation, and securing of same relative to and onto said nozzle holddown ring. This practice is followed by inserting, orientating, and securing the center portion of said nozzle dam means and thereafter torquing all bolting means to predetermined limits. Removal from said channel head of all said attendant tubesheet tackle means along with other asunder apparatus is, of course, also contemplated before the channel head is rendered ready for various testing.

At periodic intervals during the operation of boiling or high pressure water, nuclear-fired, power or propulsion systems there are necessitated the occurrence of system outages such as when refueling of the nuclear reactor is to be performed or repairs are to be effected within any of the numerous water circulating loops. During such outages, it is usual for the level of the primary coolant water within the system to be lowered to a level below that of the inlet and outlet pipes extending to and from the reactor, which pipes are typically horizontally disposed therebetween. In the vernacular of this art, such procedures are known as drain-down. More specifically, in the type of reactor system which serves several vertical inverted U-tube type steam generators, the draining down is usually effected through both the chemical volume control system and the residual heat removal system, from which the draining water is led into holdup tanks. For reasons obvious to those skilled in this art, such draining down is conducted only after the system has been cooled and depressurized by releasing steam from the steam generators, shutting down the main circulating coolant water pumps, depressurizing the pressurizer, and starting the residual heat removal pumps to actuate the residual heat removal system.

Typically, during such drain-down procedure, a gas which is inert to the system, such as nitrogen, is introduced into the system through the top of the system pressurizer tank to displace the water which is draining from the system. As the water is drained from the pressurizer, whose discharge flows into one of the "hot legs," or reactor outlet conduits, which leads to the bottom of one of the steam generators, the nitrogen introduced through the pressurizer will eventually begin to disperse throughout the system from the bottom of said pressurizer. The nitrogen first enters the reactor above the water level therein via the reactor outlet conduit to which the pressurizer is connected, and then passes via all of the reactor inlet and outlet conduits, which are oftentimes horizontally disposed at the same elevation, to the respective steam generators and main circulating pumps in the respective steam generation loops.

As will undoubtedly become more readily apparent from a reading of the teachings of the instant invention, infra, it is inherent in the design of such systems that a total drain-down thereof would effect a lowering of the water level therein to such an elevation that the fuel rods placed in the spent fuel pit would not be covered in water, a most undesirable and untenable situation. This will be more fully appreciated when it is realized that the difference in elevations of the spent fuel pit and a channel head of a typical steam generator in one nuclear plant system for which the instant invention was designed and tested is about 50 feet. Accordingly, it is desirable, and perhaps more importantly necessary, to partially reverse such drain-down procedure at the appropriate stage to ensure that work may proceed concurrently on both the primary and the secondary sides of the system even after adjusting the system water level upwards.

From an inspection of a system typical of the type herein referenced, it will be appreciated that the juxtaposition of the nozzle holddown ring and the outlet conduit of the channel head provides a situs suitable for closing or blocking off water flow back into the channel head upon subsequent raising of the system water level. Since no apparatus or mechanism such as, for example, a valve or plug, is present at this situs, one, or an equivalent thereof, has to be introduced thereinto. Accordingly, the nozzle dam means referred to, supra, generally comprising a gasketed plate adapted for operative association with the nozzle holddown ring, is the usual means which is introduced and secured at such situs to seal off the opening of the nozzle holddown ring and effect closure of the steam generator outlet conduit. Once this nozzle dam and its companion, i.e., one each for the steam generator outlet conduit and the steam generator inlet conduit, is secured, the raising of the water level in the system will not act to flood the respective channel head into which such nozzle dams are secured. Of course, if more than one steam generator is operatively associated with the reactor, the respective nozzle dams in each of the channel heads would likewise be secured. Because the only viable means of ingress to the channel head is the manway therein provided, and further, since the inside diameter of said manway is typically one-half that of the outer diameter of said nozzle dam, said nozzle dam is provided with hinging means to allow for the folding thereof. This design criteria results in a discontinuity occurring right down the middle portion of such sealing means, which design may prove to be less than desirable for effecting a positive seal. Accordingly, a substantial portion of each half of said dam is usually removed or left out, during the fabrication thereof so that a center portion of the nozzle dam may be fitted and tightly secured in a manner which effectively overcomes the disadvantages otherwise associated with, and the location of, such discontinuity. Also, of course, such a design consideration helps reduce the weight of the dam.

As to the feature of the instant invention which relates to said tubesheet tackle means and the securing of same, it has been noted, supra, that the tubesheet provides little in the way of opportunity for attachment. Accordingly, it has been common practice in such instances to employ the use of devices for attaching to the inside surfaces of the tubes.

It has long been known to employ various means to expand a device within a tube as a way of gripping the tube from within its internal diameter. While there are many examples of this art, one of the more commonly known methods is the plug of the type used in Thermos TM bottles. In this prior-art design, a rubber plug that is slightly smaller than the hole is squeezed between two end restrictions to cause it to expand radially into contact with the inside of the tube diameter and thus become wedged into the hole.

One application of a tubesheet internal tube gripper is a grapple attached to the inside of the tubes of tubesheets of the type typically found in a nuclear steam generator. Periodically it is necessary to perform maintenance or inspections from within the heads of these very large heat exchangers. Typically such a steam generator has some 3,000 or more tubes originating in a tubesheet above a channel head, which head is generally a hemisphere usually ranging between about seven to eight feet in diameter. When maintenance or inspection is performed, it is necessary to hang equipment such as closed circuit television cameras, pulleys, safety lights, certain other test fixtures, and other items from the tubesheet. Since the tubesheet surface is usually a layer of Inconel TM, magnetic clamps cannot be used. Furthermore, each of the tubes is welded into the flat tubesheet, so that the tube holes present the only likely surface to which an attachment can be made.

The simple expanding plug, such as that used in a Thermos TM bottle, supra, is effective for light loads. Since it relies only on friction, it cannot withstand heavy loads if the coefficient of friction is reduced due to wetness or other contaminant on the inside tube surface.

A substantial improvement on the expanding plug means, supra, has been fairly recently developed and comprises a shaft member including an upper tapered portion, surrounded by a generally cylindrical sleeve member, having at least two holes opposite the tapered portion of the shaft. The sleeve outer diameter is slightly less than the inner diameter of the tube to which the attachment is to be effected. Spring means are connected between the shaft member and the sleeve member for biasing the tapered shaft downwardly relative to the sleeve. A metal ball is located in each hole such that downward motion of the shaft relative to the sleeve urges the balls outwardly to protrude from the sleeve surface against the tube wall. For convenience and ease of reference, this improved device is herewith referred to as a rapid installation tube gripper.

Only the tubesheet tackle means and not the securing of same with the use of a specially designed tackle insertion tool means according to the instant invention, is based, at least in part upon the design of the rapid installation tube gripper, supra; however, as will be appreciated from the more detailed description, infra, the instant design and utilization substantially further improves upon the art of inside tube grapplers in general, and more specifically of such rapid installation tube gripper.

As to the feature of the instant invention which relates to said suitable nozzle dam strapping means, which is to be operatively associated with said nozzle dam, it will be understood that in the preferred embodiment of the instant invention the strapping means are first secured to the nozzle dam means. Alternatively it may be inserted, with the aid of a tackle insertion tool through said open manway, from a remote location outside the channel head and subsequently properly secured to the still folded nozzle dam, which dam has previously been inserted into the channel head. The principal purpose of said strapping means is to effect the subsequent opening of said nozzle dam and the translocation and proper positioning of same onto the nozzle holddown ring. With the aid of the nozzle dam rotation tool and the alignment pin tool or video camera, the proper orientation of same relative to said nozzle holddown ring is also effected. As described, supra, both the nozzle dam rotation tool and the alignment pin tool are manipulated, through the open manway, by operator(s) who are located outside said channel head and the resulting properly aligned nozzle dam is temporarily secured to the nozzle holddown ring with the aid of bolt starting tool means. Since some of the activities of said operators must be coordinated, one with the other, said operators oftentimes wear headphones to facilitate communication with each other and, in some instances, support personnel in standby mode including Radiological Control Group (RAD-CON) monitoring of radiation exposures, doses, etc. The inserting, orientating, and securing of the center portion of said nozzle dam means is also accomplished with the aid of at least a portion of the strapping means, i.e., the two 25-inch intermediate length straps of the six normally utilized, as well as with the use of an appropriate hook pole and bolt starting tool. The reverse procedure, i.e., the removal of the nozzle dam may also be effected with the aid of these apparatuses.

As to the feature of the instant invention which relates to said other tooling, for example, the various nozzle dam rotation tools, bolt starting tools, tube marking poles, mirror poles, tackle insertion tool, alignment pin tool, hook poles, the specific designs, as well as the functions and operations thereof, will be described in some greater detail, infra.

2. Description of the Prior Art

As has been noted, supra, several prior-art investigators have discovered, taught, and disclosed methods and/or means for attaching to the inside surface of tubes so as to provide for means to secure and hang various asunder equipment from the tubesheet. An example of such prior art is found in the teachings and disclosure of U.S. Pat. No. 4,643,472, Schukei, et al., Feb. 17, 1987. Schukei, et al., describe a rapid installation tube gripper which generally comprises a shaft member including an upper tapered portion surrounded by a generally cylindrical sleeve member having at least two holes opposite the tapered portion of the shaft. The sleeve outer diameter is slightly less than the inner diameter of the tube targeted for attachment. Resilient means are connected between the shaft member and the sleeve member for biasing the tapered shaft downwardly relative to the sleeve. A relatively small metal ball such as, for example, a ball bearing, is located in each hole such that downward motion of the shaft relative to the sleeve urges the balls outwardly to protrude from the sleeve surface against the tube wall.

According to the teaching of Schukei, et al., their device is installed by pushing on the stem means at the lower end of the shaft member to insert their device into the tube. A stop means, such as a flange, is formed at the lower end of the sleeve to limit the sleeve insertion into the tube. In this way, the tapered portion may be pushed longitudinally upward relative to the holes, whereby the balls are retracted into the sleeve and their device may be installed into or removed from the tube.

A device only somewhat similar to that of Schukei, et al., is employed in the practice of the instant invention in providing attachment means onto the tubesheet. Said device, herein referred to as tubesheet tackle means or simply tubesheet tackle or just tackle, comprises a shear plate to which at least one shaft member, having such upper tapered portion, is rigidly attached together with at least one, and preferably two tapered insertion pins. Said at least one shaft member and said pins are spaced one from the other on said shear plate to align with three predetermined tube apertures, preferably arranged in triangular relationship, one from the other. This arrangement effects substantially improved stability of the instant new apparatus well beyond that provided by prior-art devices. Also, instead of the use of flange means, located at the lower end of the sleeve for effecting movement thereof relative to said tapered shaft and resulting retraction of the balls, the instant device employs a retracting ring attached on one side of the spring biased movable sleeve for engagement with a tackle insertion tool at or near the lower end thereof, which lower end is spaced horizontally above said shear plate when said device is orientated in the proper insertion and attachment mode.

This new and improved arrangement allows for the utilization of a tackle insertion tool in combination with said tackle to effectively and remotely provide attachment means on said tubesheet, whereas the device of Schukei, et al., supra, is designed and adapted for attaching to the tubesheet primarily by hand, thereby requiring ingress of an operator into said channel head. As discussed in greater detail in Example I, infra, an attempt was made to provide a companion insertion tool to operate in unison with said normally hand-held Schukei, et al., device, but proved to be quite inadequate.

Applicants are presently unaware of any prior art, either in the patent literature or in the offerings and listings in currently circulated vendors' catalogs which teach, disclose, or in any way lead towards the teachings of the instant invention other thant that just discussed, supra.

SUMMARY OF THE INVENTION

The instant invention relates to a vastly improved system including methods, techniques, and means for remotely installing nozzle dams onto nozzle holddown rings within the channel heads of steam generators operatively associated with nuclear-powered electric generating units. In a typical nuclear-powered generating unit of the pressurized water type, the design thereof normally associates four such steam generating units with a single nuclear reactor. Since the channel heads of such steam generators are normally divided into a primary water inlet and primary water outlet there is opportunity, in many instances, for installing eight such nozzle dams. During a planned or unplanned outage of such a generating unit, it is oftentimes necessary to practice a drain-down procedure which involves, usually by gravity flow, draining the primary water from various sections of the reactor and the steam generators associated therewith and also from various connecting conduits and ancillary equipment, it being understood that the water removed therefrom is normally introduced into one or several holding tanks until a later time when it is returned to the system. It is incumbent upon the practice of such drain-down procedure that the fuel rods, both in the core of the reactor and those in or transferred to the spent fuel pit, remain submerged under such primary water throughout the term of the outage for a number of important reasons including minimizing the generation of radiation, maintaining the proper and predetermined barn cross section in the core, and ensuring that no localized overheating in any portions of the core occurs, etc. To those skilled in the art, in the practice of such drain-down procedure it has long been known that this practice must be interrupted after the water from the steam generator tubes, as well as that in the channel heads, has cleared the channel head outlet conduit to provide for the insertion of closure means over the inlet to such conduit, i.e., the outlet from the channel head. Since the channel head generally comprises the bottom half of a sphere some seven or eight feet in diameter and is constructed of heavy gauge stainless steel to withstand operating pressures therein, usually in excess of 2,000 psig; and, furthermore, since said steam generator outlet conduit must also be properly designed and engineered to withstand similar pressure, it being in operative and permanent association with the channel head, the only means of ingress for such channel head is provided by a relatively small aperture through the bottom or side wall thereof, which aperture is commonly referred to as a manway. Because of various design conditions and parameters, such manways are necessarily kept as small as is practical and possible. As a result of these design criteria, provisions are made for either passing pieces of the nozzle dam through the manway or, more preferably, providing a nozzle dam which folds in half and can be passed through the manway and into the channel head. Under procedures developed until the advent of the instant invention, the normal modus operandi was to fold a nozzle dam upon itself, insert same into and through the manway, and subsequently also insert a nozzle dam center section. The subsequent movement, unfolding, orientation, and securing of the nozzle dam together with such center section thereof was accomplished by means of a human operator entering the channel head through such manway and effecting at least some of the steps just supra. It will, of course, be appreciated that the environment in the channel head, by virtue of its having contained primary water circulated through the core of the nuclear reactor, only allows for very short periods of time for operation or working therein. In fact, an operator entering such a channel head will oftentimes receive his three-month radiation dose limit in but a matter of a couple of minutes. Consequently, the moving, orientation, and securing of the nozzle dam onto the nozzle holddown ring will oftentimes require a succession of operators to enter "jump" the manway, perform the allotted tasks, and remove themselves from the manway. If the total stay time in the channel head is fixed at three minutes it will be appreciated that due to the time allotted for purposes of ingress and egress, as well as orientation and setup, that many such operators may be exposed to their three months' dose limit for the fixing of but one nozzle dam onto its companion nozzle holddown ring. The usual procedure is to allow for a jump time of only about 30 seconds.

The instant invention relates to a new and novel approach, including a system, as well as techniques and apparatuses for effecting same, whereby such nozzle dams may be placed within the respective channel heads, translocated, and properly orientated therein and together with their center pieces secured to the respective nozzle holddown rings without the need for even the ingress of a single operator into the adverse environment presented by such channel heads. In the practice of the instant invention, suitable tubesheet tackle means is located onto the appropriate first situs of the tubesheet, generally defining the upper horizontal boundary of such channel head, by means of special tooling operated through the open manway and by an operator at a situs outside the confines of the subject channel head, i.e., by the use of a tube marking pole and tackle insertion tool. Subsequently, lifting means may be secured to such tubesheet tackle means and a second situs remote from said channel head for aiding in the passing through the manway of the folded nozzle dam and also the center section thereof; however, the lifting means (the rope) is preferably passed through the pulley of the tubesheet tackle means prior to its location and attachment on the tubesheet. A second tubesheet tackle means is located at another or third situs on said tubesheet, said third situs being generally vertically above said nozzle holddown ring or preferably that tubesheet tackle means first referred to above, is removed and translocated to such situs over said nozzle holddown ring. In the later practice of the instant invention, the first situs, which first situs was usually located vertically above the center line of the manway, was no longer used. The subsequent procedure was to attach the tackle to the situs above the center line of the nozzle holddown ring and operatively associate the first lifting means (the rope) with such tackle and the second lifting means (the winch). The winch was located at the second situs referred to supra, i.e., outside the manway and on the winch stand attached to the grating therebeneath. This procedure was found to be the most preferred for installation of the various nozzle dams. However, that practice of the instant invention which relates to the unsecuring and removal of the nozzle dam from the respective channel heads has now been found to be best performed by an arrangement whereby the tubesheet tackle is attached to the tubesheet at a point above the center of the manway instead of above the nozzle dam with, of course, the first lifting device or means (the rope) operatively associated with the tackle thereat and said second situs, i.e., the winch. Thusly, for installation of the nozzle dams, the most preferred situs on the tubesheet is above the center of the nozzle holddown ring which heretofore was referred to as the third situs, and for the removal of the nozzle dam from the nozzle holddown ring and ultimately from the channel head, the most preferred situs on the tubesheet for the tubesheet tackle is above the manway, which heretofore was referred to as the first situs. Several specially designed tooling means are passed through the open manway and manipulated by the ends thereof, still outside the confines of said channel head, so as to carry out several sequences of operations including attaching the first lifting means to the strapping means to cause the lifting and unfolding of the nozzle dam and the subsequent movement thereof over the nozzle holddown ring. Other tooling, such as a nozzle dam rotation tool, is utilized for properly turning the nozzle dam in relation to the nozzle holddown ring. At TVA's Sequoyah plant this requires usually about 90 degrees counterclockwise on one side of the channel head and about 90 degrees clockwise on the other side of the channel head; whereas, at TVA's Watts Bar plant no such 90-degree orientation is required. Still other specially designed tooling is operated in the channel head from the same remote location outside the confines thereof, i.e., said second situs, and through the manway to inspect the orientation of such nozzle dam and to engage securing means mounted on the nozzle dam with the nozzle holddown ring, i.e., using a tubesheet mounted video camera. It will also be understood, of course, that if desired means are provided for remotely introducing and attaching to the tubesheet other ancillary equipment. The operation of the instant invention effects such introduction, translocation, orientation, and/or securing of the nozzle dam onto the nozzle holddown ring in a completely remote mode without requiring the entrance into the channel head of a human operator. However, it will be understood that during the manipulation of some of the tooling the operator may find it convenient or deem it necessary to periodically reach through the manway with his hands and the lower part of his arms and occasionally, maybe only several times during such operation, to introduce a portion of his head thereinto for purposes of effecting visual inspection.

It will also be appreciated, that since equipment has been developed and is available for subsequent introduction into the channel head and onto the nozzle dam for purposes of torquing all of the attachment bolts, the first stage of technique and methodolgy of the instant invention is initiated at about the time of the remote introduction of the tubesheet tackle means through the manway and terminates at about the time that the bolts utilized for securing of the dam to the nozzle are started. Although not necessary to the description of the instant invention, it will be appreciated that certain clean-up operations are oftentimes necessary such as, for example, removal of tubesheet tackle and the strapping means together with the several pieces of tooling which may have been left protruding out of the manway. The second stage of operation of the instant invention involves the utilization of the instant tubesheet tackle and lifting means to introduce and orientate a later-mentioned torquing machine into the channel head and onto the nozzle dam and center section thereof for properly torquing the appropriate holddown bolts. Likewise, the initiation of the third stage of practice of the instant invention may be characterized by the procedures for remotely removing the nozzle dam from the channel head beginning after the untorquing of said attachment bolts.

OBJECTS OF THE INVENTION

It is therefore the principal object of the present invention to develop a new system, method, and means for easily, quickly, accurately, and most importantly remotely introducing into a nuclear reactor steam generator channel head, said head having a tubesheet thereover, folded nozzle dam means together with tubesheet tackle means, lifting means, and strapping means in a manner predetermined so that operative engagement of said strapping means with said lifting means, said lifting means operatively associated with said tubesheet tackle which tackle is in turn operatively associated with said tubesheet, causes the unfolding of said nozzle dam and the translocation thereof onto the companion nozzle holddown ring to which it is intended to be secured, thereafter providing means, if necessary, for properly orientating said nozzle dam in angular relationship with said nozzle holddown ring, providing for at least a temporary securing of the nozzle dam onto the nozzle holddown ring, and either prior to said securing of said nozzle dam to said nozzle holddown ring or more preferably subsequent thereto, introducing into said channel head attendant center section means for companion engagement with said nozzle dam, subsequently providing means, if necessary, for orientating same relative to said nozzle dam, and thereafter at least temporarily securing said center section of said nozzle dam to the main body thereof usually by means providing for the bolting of same directly to the nozzle holddown ring.

Another object of the present invention is to develop a new system, method, and means for easily, quickly, accurately, and most importantly remotely introducing into a nuclear reactor steam generator channel head, said channel head having a generally horizontally disposed tubesheet comprising its uppermost boundary, folded nozzle dam means; introducing either prior to or subsequent to the introduction of said folded nozzle dam means, into said channel head and operatively associating with said nozzle dam means, tubesheet tackle means, lifting means, and nozzle dam strapping means in a manner predetermined so that subsequent operative engagement of said strapping means with said lifting means, which lifting means being attached to said tubesheet through said tubesheet tackle means, causes the unfolding of said nozzle dam and the translocation thereof onto the companion nozzle holddown ring to which it is intended to be secured; thereafter providing means, if necessary, for properly orientating said nozzle dam in angular relationship with a reference point or marker near said nozzle holddown ring and usually in close proximity to a known bolt hole and; if deemed desirable, providing means for inspecting such orientation; providing for at least temporary securing of the nozzle dam onto the nozzle holddown ring; introducing into said channel head attendant center section means for companion engagement with said nozzle dam, either prior to said securing of said nozzle dam to said nozzle holddown ring or more preferably subsequent thereto; subsequently providing means, if necessary, for orientating same relative to said nozzle dam and; if deemed desirable, providing means for inspecting such orientation; and thereafter at least temporarily securing said center section of said nozzle dam to said nozzle holddown ring, whereby said procedure substantially eliminates the need for ingress of human operators onto said channel head.

Still another object of the present invention is to remotely introduce into a steam generator channel head folded nozzle dam means; introducing either prior to or subsequent to the introduction of said folded nozzle dam means, into said channel head, and attaching to said nozzle dam means suitable strapping means in a manner predetermined so that subsequent operative engagement of said strapping means with lifting means, which lifting means has also been introduced, at least in part, into said channel head, causes the unfolding of said nozzle dam and the translocation thereof onto the companion nozzle holddown ring to which it is intended to be secured; thereafter providing means for properly orientating said nozzle dam in angular relationship with reference to said nozzle holddown ring and providing for at least temporary securing of the nozzle dam onto the nozzle holddown ring; introducing into said channel head attendant center section means for companion engagement with said nozzle dam and subsequently providing means for orientating same relative to said nozzle dam and thereafter at least temporarily juxtaposing said center section of said nozzle dam to the main body thereof and securing said center section to said nozzle holddown ring, whereby said procedure substantially eliminates the need for ingress of human operators into said channel head; said procedure characterized by the intermittent and periodic use of special tooling means during certain sequences thereof for properly locating and securing tubesheet tackle means at a predetermined situs to aid in both the ingress of said nozzle dam and said center section into the channel head followed by the translocation of same for operative engagement with said nozzle holddown ring and for the subsequent egress of such nozzle dam and center section from said channel head.

A still further object of the present invention is to provide a new system eminently suitable for quickly and remotely introducing into a nuclear reactor steam generator channel head folded nozzle dam means; and for providing means for introducing either prior to or subsequent to the introduction of said folded nozzle dam means, into said channel head, tubesheet tackle means, strapping means, and at least a portion of first lifting means and attaching to said nozzle dam means said strapping means in a manner predetermined so that subsequent operative engagement of said strapping means with said lifting means causes the unfolding of said nozzle dam and the translocation thereof onto the companion nozzle holddown ring to which it is intended to be secured, said first lifting means being in operative engagement with a second lifting means and said tubesheet tackle means, and said tubesheet tackle means, in turn, being in operative engagement with the tubesheet, which tubesheet generally defines the uppermost boundary of said channel head; thereafter providing means, if necessary, for properly orientating said nozzle dam in angular relationship with said nozzle holddown ring and; if deemed desirable, providing means for inspecting such orientation; providing for at least temporary securing of the nozzle dam onto the nozzle holddown ring; introducing into said channel head center section means for companion engagement with said nozzle dam onto said nozzle holddown ring and; if deemed desirable, providing means for inspecting the orientation thereof; and thereafter at least temporarily securing said center section of said nozzle dam to said nozzle holddown ring, whereby said procedure substantially eliminates the need for ingress of human operators into said channel head; said procedure characterized by the intermittent and periodic use of special tooling means during certain sequences thereof for properly locating and securing tubesheet tackle means at a predetermined situs to aid in both the ingress of said nozzle dam and said center section into the channel head through an open manway together with the translocation of same for operative engagement of said nozzle dam and said center section with said nozzle holddown ring and the subsequent egress therefrom; said system characterized by special tooling means to be used during certain sequences for properly locating and securing tubesheet tackle means at a predetermined situs to aid in both the ingress of said nozzle dam and said center section into the channel head, for the translocation of same for operative engagement of said nozzle dam with said nozzle holddown ring and also for the egress of said nozzle dam and center section therefrom; said system further characterized by tooling means designed for introduction of nozzle dam lifting means into said channel head for operative engagement of same with both said nozzle dam and said lifting means.

Still further and more general objects and advantages of the present invention will appear from the more detailed description set forth below, it being understood, however, that this more detailed description is given by way of illustration and explanation only, and not necessarily by way of limitation, since various changes therein may be made by those skilled in the art without departing from the true spirit and scope of the present invention.

BRIEF DESCRIPTION OF THE DRAWINGS

The present invention will be better understood from a consideration of the following description taken in connection with the accompanying drawings in which:

FIGS. 5 and 6 show, respectively, a planer as well as a detailed cross-sectional view taken along lines 6—6 of FIG. 5 of the tackle insertion tool showing the receiving and the engagement means for cooperation with said tubesheet tackle.

FIGS. 7 and 8 show, respectively, a planer as well as a detailed cross-sectional view taken along line 8—8 of FIG. 7 of the nozzle dam means.

FIGS. 13 and 14 show a side elevational view of bolt starting tool means depicting the approximate proportional relationship between the various fixed segments thereof and the angles therebetween for the short tool and for the long tool, respectively.

FIG. 18 is a perspective illustration of one embodiment of torquing means utilized in the practice of the instant invention for utilization in securing bolts through the nozzle dam and nozzle dam center section to receiving apertures provided in the nozzle holddown ring.

DETAILED DESCRIPTION OF THE DRAWINGS

For the sake of clarity and a better understanding of the applicability of the illustrations of the various drawings, a more detailed description of the same is given below. Note particularly, that in several of the following drawings the various apparatuses are shown or depicted in both planer view and in companion side-elevational view usually in cross section. Accordingly, in instances wherein possible, the numbering utilized therein is of the same sequence for equivalent subassemblies. For example, the rapid tube gripper is shown and identified as 301 in FIG. 3, and as 401 in FIG. 4. Also note that in some of the descriptions which follow, it has been found convenient to simultaneously refer to the same subassembly by both reference numbers. Accordingly, if it is desired to simultaneously refer to both 301 and 401 at the same time, the reference thereto would be 301/401.

Figure 1:
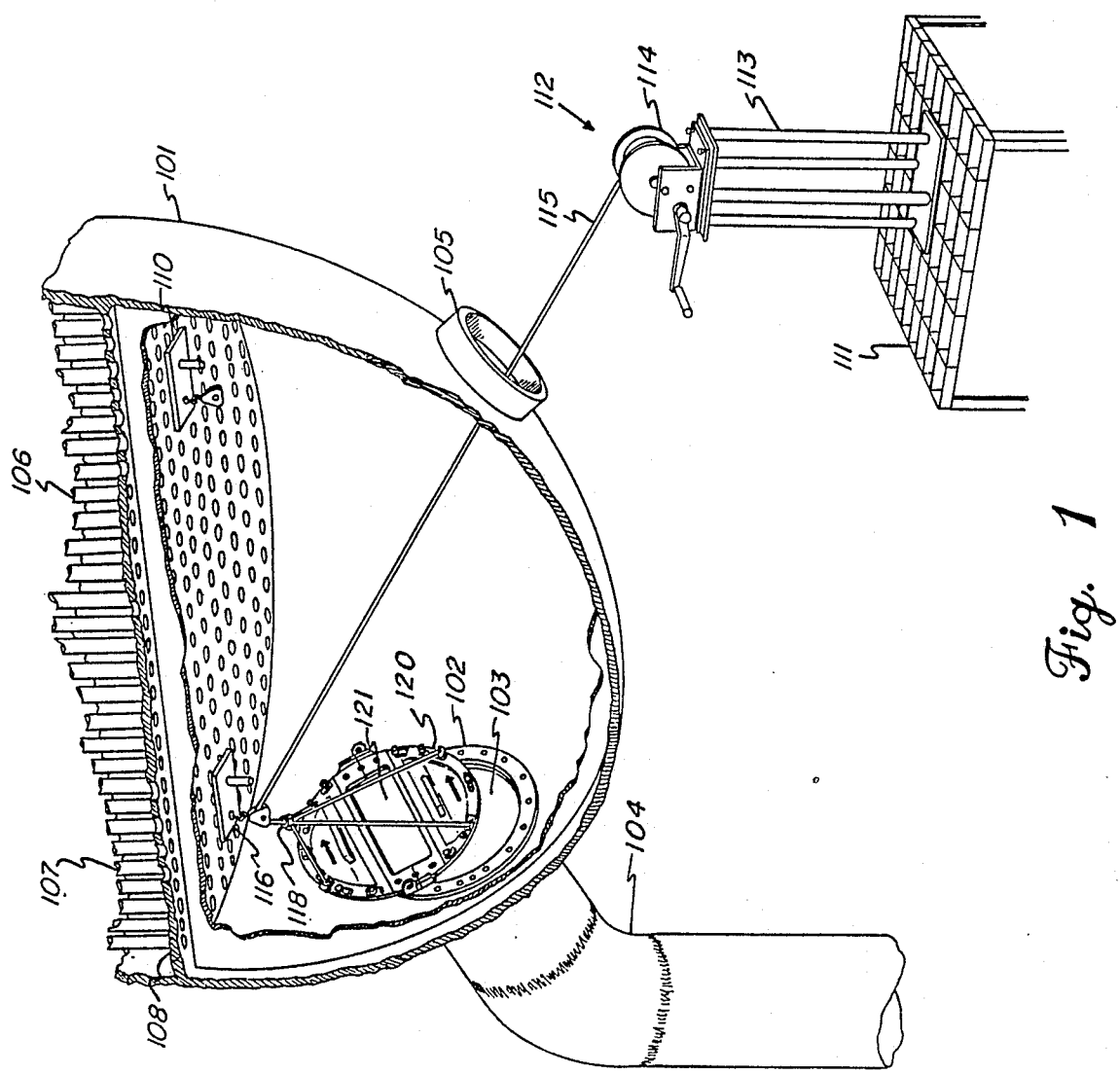
FIG. 1 is a diagrammatic and fragmentary illustration, to an enlarged scale, of only certain portions of a nuclear power steam generating system with the detailed cross-sectional view of the channel head taken along a line in a plane which is parallel to the vertical divider wall and a small incremental distance removed therefrom in a direction away from the observer.

Referring now more specifically to FIG. 1, it will be appreciated that the illustration comprises substantially one-half of a typical channel head generally illustrated at 101. It is well known to those skilled in this art, that a typical channel head such as, for example, the type associated with the Westinghouse series 51 generator, generally comprise the bottom half of a sphere of some 7 or 8 feet in diameter with the top horizontal boundary plane thereof defining the tubesheet and with a vertical divider wall extending from said tubesheet through the middle of said hemisphere and attached to the inside peripheral surface of such channel head. Accordingly, said vertical divider plate is in the general form of a plate defining a semicircle. It will therefore be further appreciated, that the cross-sectional view of the channel head in FIG. 1 is taken along a line which is in a plane parallel to said vertical divider wall and a small incremental distance removed therefrom away from the point of perspective of the viewer. Nozzle holddown ring 102 is affixed through the wall of channel head 101 and defines aperture 103, the beginning in this half portion of the channel head, of steam generator primary water outlet conduit 104, which outlet conduit is usually on the order of 32 inches in diameter. Channel head manway 105, shown herein absent its closure means, defines an aperture in the side or bottom wall of channel head 101 on the order of 16 inches in diameter and provides for ingress and egress of equipment and operators to and from channel head 101. Also shown, are fragments of two vertical U-tubes 106 and 107 which terminate at tubesheet 108 and discharge cooled primary water into this half of channel head 101 after having entered said tubes in superheated condition in the substantially mirror image, not shown, of this half of channel head 101 and having passed into the steam generator section, not shown, and over the inverted U-configuration thereof, also not shown, it being understood, of course, that a typical tubesheet in such an installation contains on the order of some 3,000 vertical U-tubes in nested arrangement. Tubesheet tackle means 110 is generally illustrated at a situs located generally above the center line of manway 105 and comprises a horizontally disposed shear plate together with attachment means, generally shown as a pulley, together with one or more rapid installation tube grippers, as well as one or more tapered insertion pins inserted into the lower portion of several inverted U-tubes. For the sake of clarity, the details relating to said tube gripper(s) and said tapered insertion pin(s) are not shown. It will be appreciated that an early embodiment of the instant invention taught the use of tackle 110 at this situs and subsequently either tackle 110 was moved to a situs generally vertically above the center line of nozzle holddown ring 102 or a second tackle 116 was therein installed. As presently practiced, tubesheet tackle 116, at about the situs shown, is utilized for purposes of ingress, translocation, orientation, and/or securing of nozzle dam 120 and the center section thereof, not shown, whereas tubesheet tackle 110, at about the situs shown is utilized for the dismantling operation, i.e., the unfastening of center section, not shown, abut which would fit in the aperture indicated at 121, and removal from channel head 101, followed by the unfastening of nozzle dam 120 from nozzle holddown ring 102, the folding thereof, and the subsequent removal thereof through manway 105 from channel head 101. Scaffold means or staging platform 111 is generally illustrated as being remotely located from channel head 101 and is provided for facilitating entry into and exit from channel head 101 through manway 105 of equipment and by personnel in the practice of the prior art. Shown attached to staging platform 111 at situs two is second lifting means generally located at 112 and comprising, for example, stand 113 and winch means 114. Rope, or more specifically first lifting means 115, is shown operatively associated with second lifting means 112. As shown in FIG. 1, second lifting means 112 is operatively connected with first lifting means 115 through manway 105 to tubesheet tackle means 116, and nozzle dam strapping means 118 to nozzle dam 120. Although it may not be readily apparent from the illustration, supra, the force vectors applied to nozzle dam 120 through the two short straps and two long straps generally comprising nozzle dam support means, or more specifically strapping means 118, via rope or more specifically first lifting means 115 positioned generally beneath tubesheet tackle means 116 have urged nozzle dam 120, in contact with the inner surface of channel head 101, up and over the edge of nozzle holddown ring 102 to later effect the ultimate closure of aperture 103. For purposes of clarity, the set of intermediate length straps are not shown herein. Nozzle dam 120 is provided with aperture 121 for subsequent receiving of the nozzle dam center section, not shown. Although, in this illustration, aperture means 121 in nozzle dam 120 for receiving said center section is shown as a void, in actual practice, flexible seal means, for example, a circular rubber or fabric gasket completely, or substantially completely, covers the bottom of nozzle dam 120. It is, of course, understood that other equipment such as, for example, tubesheet mounted video cameras and certain test equipment, not shown, may be attached to tubesheet 108 by other tubesheet tackle means similar to tubesheet tackle means 116. It should also be appreciated that the elevation of staging platform 111 in relationship to manway 105 is such so as to provide for insertion of the head and arms of an operator standing on staging platform 111. It should be further appreciated that the other half of channel head 101 is essentially a mirror image of that illustrated in FIG. 1 with several exceptions, for example, the aperture therein corresponding to 103 defines the terminus of the steam generator primary water inlet piping, which inlet piping usually elbows from the horizontal rather than to the vertical as does the generator outlet piping. From this it will be appreciated that second lifting means 112 needs to be moved in a direction perpendicular to the channel head vertical divider wall and along the surface of staging platform 111 for operative association with the manway serving said second half of channel head 101.

Figure 2:
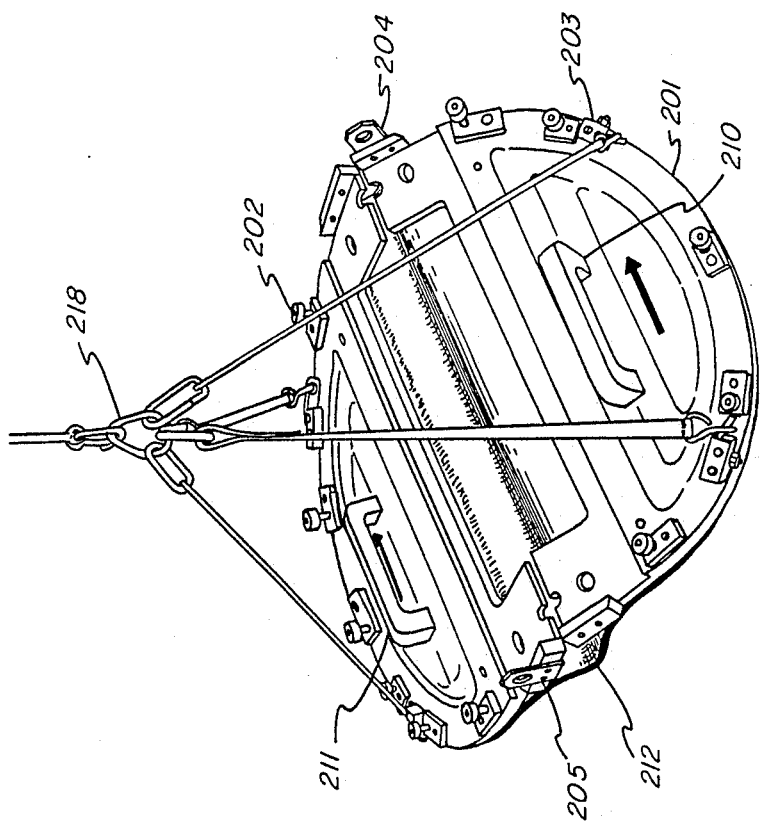
FIG. 2 is a diagrammatic illustration of a typical nozzle dam in a partially-folded mode with nozzle dam strapping means, shown in this embodiment as two short straps, two long straps, and two straps of intermediate length attached thereto with the upper end thereof being attached to a first lifting means not shown.

Referring now more specifically to FIG. 2, the diagrammatical illustration of partially folded nozzle dam 201 generally illustrates the attachment of the two sets of lifting straps comprising the nozzle dam strapping means wherein the ends of each strap juxtaposed the nozzle dam upper surface are affixed thereto by means of scissor hooks engaging lifting lugs attached to said nozzle dam one of which is illustrated at 203. The ends of each strap, specifically those attached or affixed to the nozzle dam are joined together by means of clevis hooks to singular ring 218, which ring 218 in turn is fastened to the winch clevis hook. Said winch clevis hook in turn is attached to the winch rope introduced through the pulley affixed to the bottom bearing surface of the tubesheet tackle means. In the orientation depicted, it must be appreciated that the periphery of the nozzle dam in the general area of attachment for the two short straps as well as the general area between attachment of the two long straps, although not shown, is riding on a support surface which in its intended environment is the inner surface of the channel head. When sufficient upwardly directed force is exerted on the ring joining the four clevis hooks juxtaposed the ends of each of the four straps, the nozzle dam, again in its intended environment, is caused to ride up the vertically inclined surface and onto the nozzle holddown ring, the inner surface of which lies in a plane incline off the horizontal about 45 degrees (more specifically 42 degrees). It will therefore be appreciated that if the partially folded nozzle dam depicted in FIG. 2 were resting on a horizontally disposed surface, continued upward force exerted via the winch on the rope would cause the dam to be completely unfolded into a generally horizontally inclined and disposed plane. The opened nozzle dam is depicted in greater detail in FIGS. 7 and 8, infra, including lifting lugs 204/704 and 205/705, handles 210/710 and 211/711, as well as retaining clip 202/702 and gasket 212/712.

Figure 3:
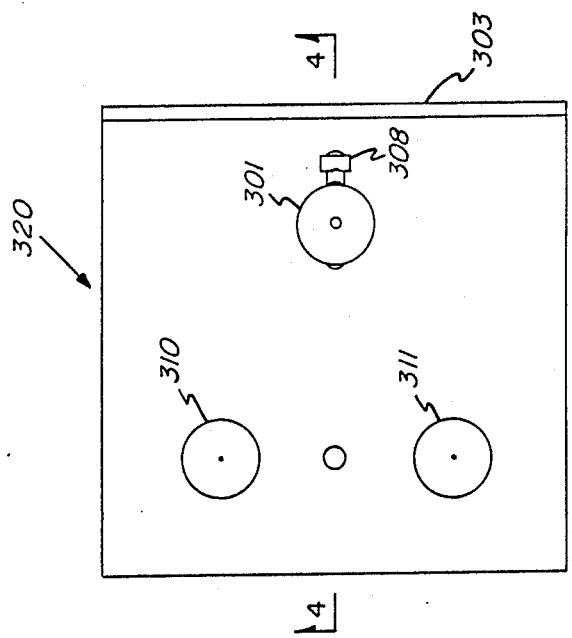
FIGS. 3 and 4 represent, respectively, a planer as well as a cross-sectional view taken along line 4—4 of FIG. 3 showing the tubesheet tackle and illustrating the cooperation of a single modified rapid installation tube gripper means and two tapered insertion pins mounted on a shear plate and having a retracting ring attached to one side of the spring biased movable sleeve of said gripper means, which assembly is more simply referred to as tubesheet tackle.
Figure 4:
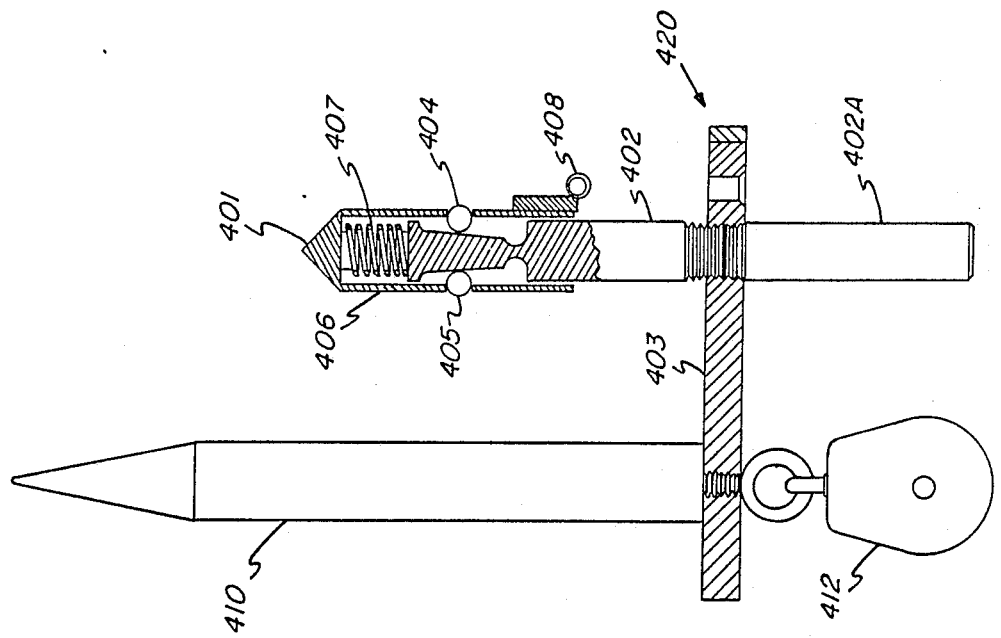

Referring now more specifically to FIGS. 3 and 4, there is shown a planer view, as well as a side-elevational view, in cross section, on line 4—4 of FIG. 3 of the new improved tubesheet tackle means of the instant invention generally illustrated at 320/420, respectively. Rapid insertion tube gripper 301 in FIG. 3 and generally illustrated at 401 in FIG. 4 is shown as stem 402 fixed to shear plate 403. As shown, the upper portion of stem 402 is provided with a tapered portion upon which steel balls 404 and 405 ride. Movable sleeve portion 406 travels vertically on stem 402 and contains apertures in the side wall thereof through which steel balls 404 and 405 protrude for engagement with the inside of a single tube, not shown. Movable sleeve 406 is spring biased by resilient means 407 against the uppermost portion of stem 402. On the side wall of movable sleeve 406 is located engagement ring 408, which is shown as 308 in FIG. 3, it being understood that engagement ring 408 is vertically positioned near, or at, the lower terminus of movable sleeve 406. Two tapered insertion pins 410, not shown, and 411 are also rigidly fixed to shear plate 403, i.e., 310 and 311 on 303 in FIGS. 4 and 3. It should be appreciated that the outer diameter of tapered insertion pins 310/410 and 311/411, as well as the outer diameter of movable sleeve 406, are slightly less than the inside diameter of the typical tubes of the tubesheet into which said rapid insertion tube gripper and insertion pins are intended for introduction. To facilitate attachment between tubesheet tackle means 420 and the first lifting means, not shown, for operative cooperation therewith, attachment means 412, generally illustrated as a pulley, is provided. In the manner of this illustration it will be appreciated that when tubesheet tackle means 420 is positioned beneath the tubesheet, not shown, and rapid installation tube gripper 301/401 and tapered insertion pins 310/410 and 311/411 are properly orientated with respect to the tubes, the urging of shear plate 403 by means of engagement with tubesheet tackle insertion tool, not shown, causes gripper 401 and pins 410 and 411 to enter the tubes until about the lowermost portion of movable sleeve 406 engages the bottom of the tubesheet, not shown. At this stage, downwardly directed force on movable sleeve 406, exerted through ring 408 attached thereto is relieved, causing spring or biasing means 407 to expand and balls 404 and 405 to ride up the tapered portion of stem 402 to engage the inside surface of the tube into which they are inserted for locking therewith, it being understood that the apertures in movable sleeve 406 cause such riding of said balls.

Referring now more specifically to FIGS. 5 and 6, there is shown a planer view, as well as an elevational view in cross section on line 6—6 of FIG. 5, of the new improved tackle insertion tool of the instant invention, generally illustrated at 501. The major portion thereof which is designed for support of companion tubesheet tackle shown in FIGS. 3 and 4, supra, generally comprises horizontally disposed member 502 provided with a vee- or wedge- or triangular-shaped portion removed therefrom, the apex of which is generally illustrated at 503. In this manner, the bottom portion of stem 402, more specifically 402A, affixed to shear plate 403 of rapid insertion tube gripper 301 (see FIGS. 3 and 4, supra) acts to guide and align tackle insertion tool 501 with tackle 320/420. In this illustration, the plethora of apertures provided in main horizontal member 502 of tackle insertion tool 501, which apertures are provided mainly to reduce the mass and weight of the assembly, are not shown. A second horizontally disposed member 504 is provided substantially parallel to member 502 and positioned vertically thereabove by a distance which is at least equal to the thickness of shear plate 403 of FIG. 4, supra. Although any number of means may be employed to position members 502 and 504 in generally parallel and spaced apart relationship, one convenient means is to use spacing plate 505 which is generally disposed at or near the two edges of members 502 and 504, which are substantially in vertical alignment, this relationship is more easily discerned by referring to FIG. 6, wherein the first substantial horizontally disposed member is illustrated at 602, the second horizontally disposed member at 604 and the generally vertically-aligned back member disposed therebetween generally at 605. As in the drawing arrangements, supra, where there is both a planer view and a cross-sectional elevational view the numbering of the respective parts, where applicable and possible, conform one to another by means of the second and third digit with the first digit referencing the drawing number to which said part assembly or subassembly relates.

In its intended environment it will be appreciated that the tubesheet tackle and, in particular, the horizontally disposed shear plate thereof (see 403 of FIG. 4) rides on top of horizontal member 502/602 with the short edge thereof, which is closest to rapid insertion tube gripper 401, engaging vertically disposed spacing member 605 and fitting beneath horizontal member 604. In order to provide adjustment and proper horizontal alignment between tackle insertion tool 501/601 and engagement ring 408 in FIG. 4, adjustment means 607, which may simply be a set screw, is provided in and through vertical member 605. The combination comprising said two vertically disposed horizontal members 502/602 and 504/604 is positioned, after the nesting of the tubesheet tackle therein, by pole means 511/611, which engages tackle insertion tool 501/601 either directly or, as shown, through movable joint 512/612 and shoulder 513/613. The end of pole means 511/611, opposite to that engaging shoulder 513/613, may be located either about 5 feet or about 8 feet, depending on whether the short or long pole is utilized, with the end thereof opposite movable joint 512/612 normally provided with cable actuating means which herein for purposes of illustration is generally shown simply as lever means 514/614. The movement of cable actuating means 514/614 causes an increase or decrease of tension exerted on cable 515/615 running between actuating means 514/614 and pin locking means 516/616 to cause pin locking means 516/616 to be inserted through the aperture defined by engagement ring 308 of the tubesheet tackle shown in FIG. 3, supra. The vertical member which carries pin locking means 516/616 is generally illustrated at 517/617 in movable engagement with minor horizontal member 504/604 generally through two or more bolts, one of which is illustrated at 518/618 as passing through vertical member 517/617 and resilient biasing means generally illustrated as spring 619, which spring 619 causes vertical member 617 to be biased away from horizontal member 504/604. Accordingly, after the tubesheet tackle, supra, is nested into proper alignment with tackle insertion tool 601, and lever means 614 is actuated to create tension on cable 615, a pivoting lever (not shown) first causes pin locking means 516 to close the gap provided for its passage into engagement ring 308, supra, and upon further tensioning of cable 615 causes said pivoting lever to engage stop means, also not shown, whereupon further tension on cable 615 causes said vertical member 617 to be forced against the biasing force separating it from horizontal member 604 by spring means 619 in a fashion to cause locking pin means 516/616 to bear vertically downward on engagement ring 408 (shown in FIG. 4) to cause the movable stem of the rapid insertion tube gripper to be freed from the steel balls wedged between said stem and the apertures in the moveable sleeve. In this manner, in the instances of a tubesheet tackle mechanism engaged with a tubesheet at the upper extremity of the channel head, the proper guidance of pole means 511/611 to cause nesting of the tackle shear plate into the generally U-shaped configuration of tackle insertion tool 601, said configuration provided by horizontal members 602 and 604 and vertically disposed back member 605 in the manner just described including activation of cable 615 will result in release of the tackle from the tubes with which it is engaged. In the reverse situation, to wit, the insertion of the tubesheet tackle into the predetermined three tubes of the tubesheet, such activation of tension on cable 615 is required until proper placement of the tackle mechanism whereupon release of tension on cable 615 causes vertical member 617 to be driven vertically upward by means of forces provided by spring 619 whereupon upward movement of ring 408 is effected by spring 407, supra, to allow the proper wedging of the steel balls between the stem and the inside of the tube with which said steel balls operably associate.

Referring now more specifically to FIGS. 7 and 8, there is shown a planer, as well as a side-elevational view, in cross section, taken along line 8—8 of FIG. 7 of a nozzle dam adapted for engagement with a nozzle holddown ring to effect closure of the inlet or outlet reactant coolant piping associated with channel heads located beneath steam generators as, for instance, the type known as the Westinghouse series 51. As shown, said nozzle dam generally illustrated at 701 is of a configuration which compliments a nozzle holddown ring and is provided with a plurality of apertures each of which is provided with a retaining clip to hold the bolt passed through said clip and into said aperture, in a raised position such that the tapered end of said bolt does not penetrate the plane defined by the bottom portion of said nozzle dam. For the sake of clarity of this presentation, each of said apertures, together with its respective retaining clip is as simply shown at 702. It will be appreciated that this simple depiction, as at 702, comprises a generally retangular-shaped metal piece usually about ⅜-inch thick, which is movable on the top surface of nozzle dam 701 in a direction generally parallel to a short arc section to the periphery thereof and is provided with an elongated first aperture through which a bolt attaches same to said nozzle dam and a second aperture provided with female threads arranged for engagement with the last few turns of holddown bolts, not shown, said last few turns being those juxtaposed the shank of said bolt between said threaded portion and the bolt head to thereby provide an arrangement whereby a portion of the threaded end of the holddown bolts ride within such apertures free of engagement with the side wall comprising said aperture and, further provided, such that after proper alignment and orientation of nozzle dam 701 relative to the nozzle holddown ring, not shown, a simple turn or two of each of said bolts will cause disengagement of the threaded portion thereof with said retaining clips thereby providing for each bolt to fall freely through such aperture in the nozzle dam in a fashion such that the tapered end of said bolt finds its intended starting position in the respective threaded aperture of the nozzle holddown ring adjoining said aperture in the nozzle dam. Generally, the nozzle dams utilized in the practice of the instant invention are provided with 20 such apertures and movable retaining clips as illustrated at 702. Nozzle dam 701 is also provided with, as shown, four adjustable retaining clips, a portion of which extend beyond the periphery of the nozzle dam and extend into the plane which is defined by the upper surface of the nozzle holddown ring so as to provide, when said nozzle dam is in proper position therewith, guide means during the rotation of said nozzle dam relative to said nozzle holddown ring to prevent any substantial misalignment or displacement between the center lines of said holddown ring and said nozzle dam. One of said adjustable retaining clips is generally illustrated at 703. Perhaps it should be noted that the nozzle dams purchased or obtained from the equipment manufacturer were equipped with two of such adjustable retaining clips and proved to be unsatisfactory in relationship to preventing misalignment between the center lines of said two pieces of equipment, supra. As part of the development of the instant invention, it was found to be a much more desirable arrangement to add two more clips to the nozzle dam to ensure against any such unwanted or undesirable misalignment regardless of the relative orientation or placement of said clips. Also, it should be noted that because two sets of straps, i.e., two short straps and two long straps are utilized as the strapping means with the scissor hooks at the bottom ends thereof requiring points of attachment such as, for example, the lifting lugs employed in the present invention, the utilization of four such retaining clips fortuitously so provided such points of attachment.

Nozzle dam 701 is also provided with two lifting lugs illustrated at 704 and 705 in a manner such that lug 704 is positioned on one side and the first end of the diameter drawn through the break line of nozzle dam 701, and lifting lug 705 being located on the other side and other end of said diameter. Although said diameter is not specifically illustrated in this FIGURE, it will be appreciated to those skilled in this art that it is coincident with section line 8—8. This arrangement is critical in that during the subsequent removal of the nozzle dam after same is disengaged from the nozzle holddown ring such as, for example, by remotely prying loose therefrom by application of pressure through bar means inserted through the open manway, the attachment to lifting lugs 704 and 705 of each of the two intermediate length straps comprising the strapping means, said attachment effected by means of specially adapted clevis hooks and the exertion of upward pressure on the nozzle dam through diametrically opposed and located lifting lugs 704 and 705 will cause resulting folding of the nozzle dam for effecting subsequent removal thereof through the open manway. As just mentioned, the clevis hook attached to the intermediate means straps are specially adapted as follows: one clevis hook is locked in an open position by means of a tie wrap secured to the safety spring biased member such that after the hook portion thereof is engaged with one such lifting lug, preferrably 704, manipulation of the tie down with, for instance, the end of a hook pole causes same to be moved down the shank of the hook sufficiently to allow the spring biased safety bar member to seek its intended position, i.e., to spring back. The normally occurring safety spring biased member on the other clevis hook is simply permanently removed therefrom. Nozzle dam 701 is also provided with two handles generally illustrated at 710 and 711, originally designed by the manufacturer to provide for the manual lifting, placing, and orientation of nozzle dam 701 in relationship to the nozzle holddown ring, not shown, with which it is to be operatively associated to provide for hydrostatic impedance or sealing of the aperture defined by said ring. To this end the bottom face of nozzle dam 701 is provided with sealing means generally comprising gasket material approximately 3/16-inch thickness and of the same general circular configuration of nozzle dam 701. The gasket is better referenced at 812 of FIG. 8, it being understood, of course, that a portion thereof is shown in that portion of FIG. 7 defined by the generally rectangular area generally illustrated at 713. The area represented by 713 is cut or machined away from the main portion of nozzle dam 701, presumably to lighten the weight thereof, and is provided with a contour for receiving engagement with the nozzle dam center section, described in greater detail in the treatment of FIGS. 9 and 10, infra. In addition, certain design criteria and considerations, presumably also allows the use of thinner gauge material throughout the body of nozzle dam 701 to further provide for lightening the weight thereof.

Figure 10:
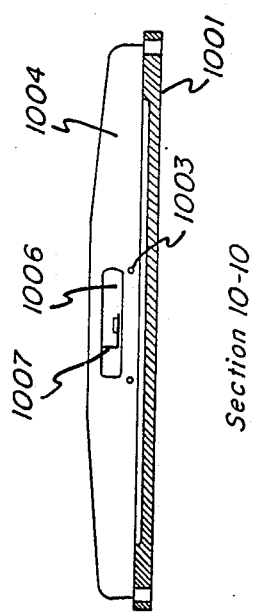
FIGS. 9 and 10 show, respectively, a planer as well as a detailed cross-sectional view taken along line 10—10 of FIG. 9 of nozzle dam center section means.
Figure 9:
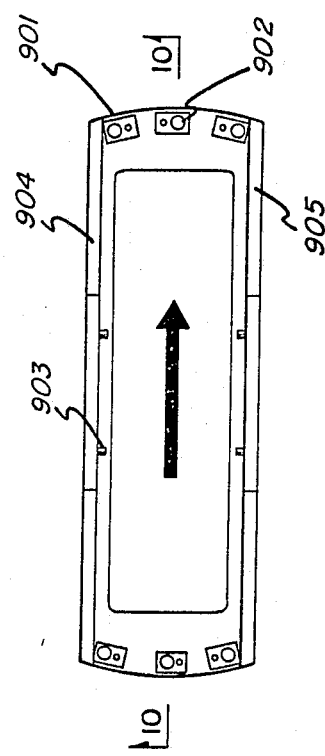

Referring now more specifically to FIGS. 9 and 10, there is shown a planer view, as well as an elevational view in cross section on line 10—10 of FIG. 9 of the nozzle dam center section assembly, generally illustrated at 901, which is adapted to operatively associate and cooperate with the aperture comprising area 713 of nozzle dam 701 described just supra in FIG. 7. The peripheral edges of nozzle dam center section 901 are, as noted previously, contoured in a manner to engage and mate with the periphery of area 713, supra, it being understood that in the vernacular of complimentary fitting, the contour of 713 generally defines the female and the peripheral extremities of nozzle dam center section 901, the male counterpart thereto. Center section 901 is provided with a plurality of apertures and retaining clips generally illustrated at 902 in the shape, configuration, and adaptation mode similar to the arrangements generally illustrated at 702 for nozzle dam 701, in FIG. 7, supra. Also shown in this illustration are four locking pins, one of which is generally illustrated at 903, press fitted into the two handles 904 and 905 of nozzle dam center section 901 and adapted for engagement with the Framatome Torquing machine, discussed elsewhere. The details of handles 904 and 905 are better appreciated in the cross section of an elevational view of center section 901, depicted in FIG. 10 as 1004. The counterpart of locking pin 903, supra, is illustrated herein as locking pin 1003 and is located between the main plane of center section 901 and the apertures of each of handles 904 and 905, one of which aperture is generally illustrated in FIG. 10 at 1006 and divided or partitioned by means of dividing means 1007, said dividing means 1007 usually comprising an angle, the short portion thereof bridging across the height of aperture 1006 and the longer portion thereof being bolted to said nozzle dam center section handle 1004 in a manner such that dividing means 1007 may be movable and adjusted as desired, it being understood that generally the smaller portion of the aperture partitioned off by dividing means 1007 is utilized for the receiving of and engagement with scissor hooks attached to the short straps of strapping means, not shown, for juxtaposing nozzle dam center section 1001 into operative communion with the cut-away portion 713 of nozzle dam 701, supra.

Figure 11:
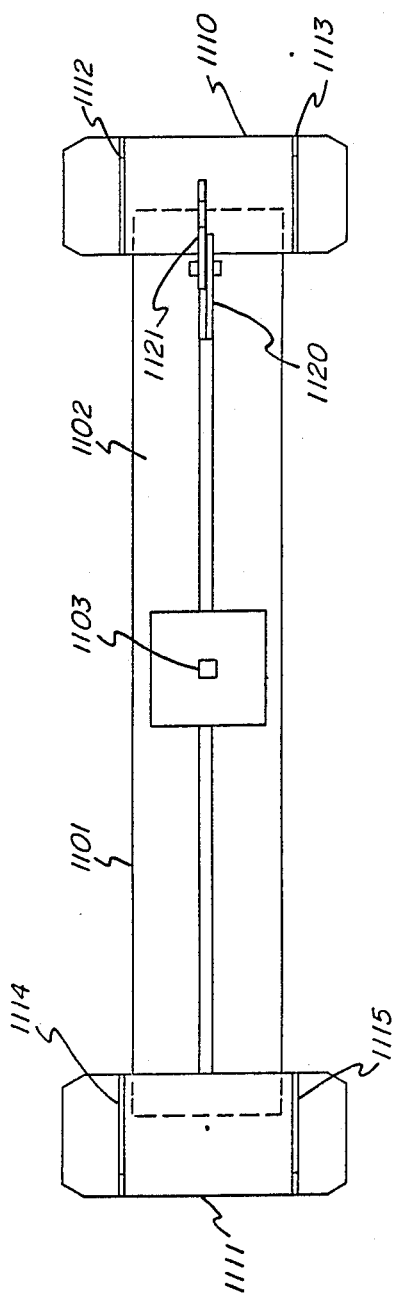
FIGS. 11 and 12 show, respectively, a planer as well as a detailed side-evelational view taken along line 12—12 of FIG. 11 of the nozzle dam rotation tool.
Figure 12:
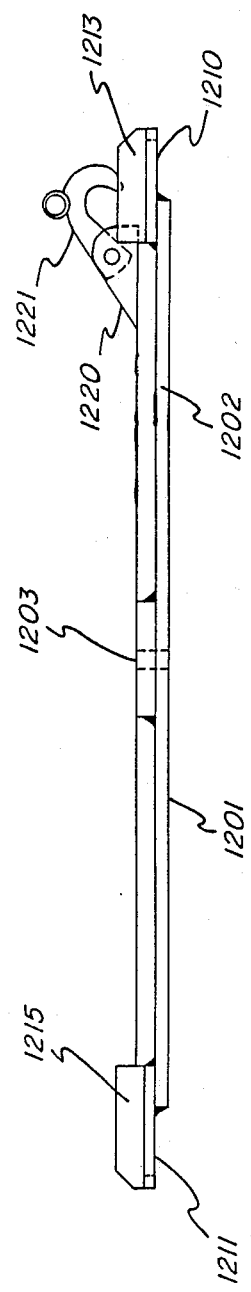
Figure 15:
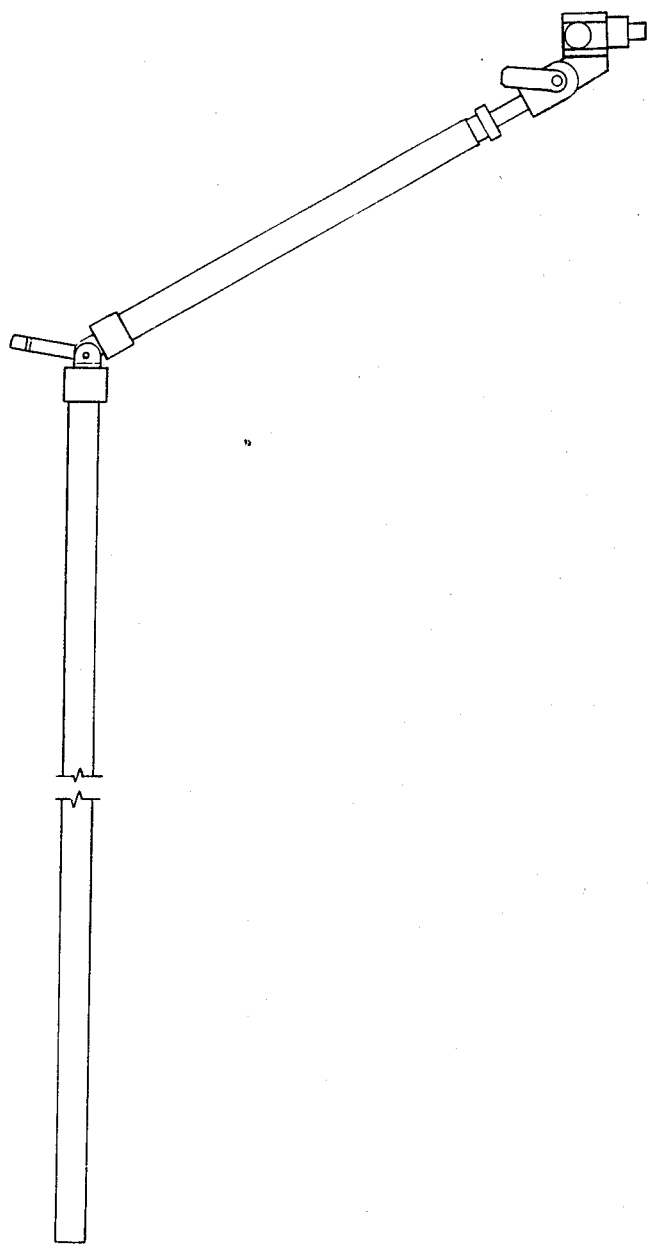
FIG. 15 is a diagrammatic illustration of a typical alignment pin tool means shown in this embodiment with a two-step insertion pin juxtaposed one end thereof.
Figure 16:
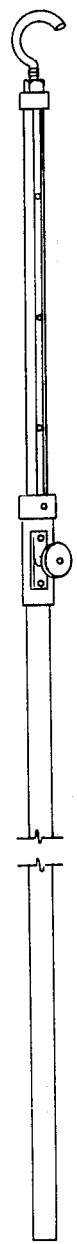
FIG. 16 is a diagrammatic illustration of a typical hook pole means shown in this embodiment with a hook located at one end thereof and length adjustment means in operative association therewith.
Figure 17:
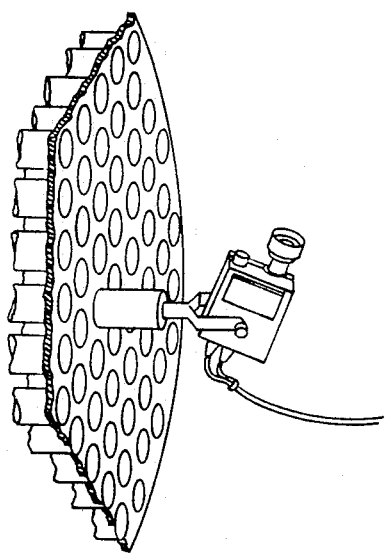
FIG. 17 is a diagrammatic and fragmentary illustration to an enlarged scale of only a certain portion of a typical tubesheet referenced more specifically as 108 in FIG. 1, infra, with tubesheet mounted video camera means attached thereto on the bottom side thereof.

Referring now more specifically to FIGS. 11 and 12, there is shown a planer view, as well as an elevational view of the new, improved nozzle dam rotational tool, which is specifically designed and operated in conjunction with the nozzle dam after it is unfolded and translocated onto the nozzle holddown ring, i.e., when the center lines of the nozzle dam and the nozzle holddown ring are essentially coincident. It should perhaps be noted at this point in the description of the instant invention, that in the instance of the arrangement of nozzle holddown rings in the channel heads of the steam generators at TVA's Sequoyah Nuclear Plant, the translocation of said nozzle dams onto the respective nozzle holddown rings requires, after alignment of the center lines thereof, rotation of the nozzle dam of about 90 degrees. For example, for one pair, i.e., two steam generators, the rotation may be clockwise on the primary water outlet side thereof when viewed from a perspective position downwardly from the tube face, and counterclockwise on the primary wter inlet side of the channel head. However, in the physical arrangement of the channel heads associated with the steam generators at TVA's Watts Bar Nuclear Plant, the translocation of the nozzle dams onto the respective nozzle holddown rings requires essentially no rotation subsequent to aligning of the center lines of the nozzle holddown ring and the nozzle dam; however, utilization of the nozzle dam rotation tool may still be required for practice of the instant invention, even in such an environment since oftentimes it is required to slightly adjust the angular relationship between the nozzle holddown ring and the mating nozzle dam. As shown in FIG. 11, the nozzle dam rotation tool generally illustrated at 1101 may be likened to the configuration of a very flattened H with cross member 1102 containing at about its center portion, connecting means generally illustrated as aperture 1103 for operative association with moment arm application means, not shown. As illustrated aperture 1103 may simply comprise a square-sectioned hole. At the extremities of horizontal member 1102 are located vertical members, generally illustrated at 1110 and 1111. The terms horizontal and vertical as used herein for describing FIGS. 10 and 11, are to be understood as referencing the respective subassemblies and their relationship depicted in the drawings and not in relation to their engagement in the actual practice of the invention. Each of vertical members 1110 and 1111 have raised portions thereof, generally illustrated at 1112, 1113, 1114, and 1115, respectively. The height of said raised portions plus the thickness of members upon which they are mounted are predisposed to allow for insertion into handles 710 and 711 of nozzle dam 701, as shown in FIG. 7, supra. Nozzle dam rotation tool 1101 is also provided, along one end of reinforcing rib of center section 1102, with wedge-shaped member 1120. Nozzle dam rotation tool 1101 is placed into operative engagement with a dam by first inserting vertical member 1111 through that handle of nozzle dam 701, supra, which is of the higher elevation. After insertion of the nozzle dam rotation tool 1101 by means of leading end 1111 into the higher disposed dam handle, nozzle dam rotation tool 1101 is allowed to slide downward or backwards until the rearward edge of wedge or skeg 1120/1220 engages the lower nozzle dam handle whereupon movable hook 1221 is closed thereover, it being understood, of course, that movable hook 1221 can be moved into proper closure mode by any number of means such as an appropriate hook pole extended through the open manway. Pressure on the moment arm application means, not shown, but operatively engaged with receiving means 1103/1203 causes turning of the rotation tool which, because of its locked engagement with the nozzle dam, not shown herein, turns the nozzle dam relative to the nozzle holddown ring.

Moment arm application means, not shown, generally comprise a ¾-inch male ratchet spindle and drive mechanism which more specifically must be a locking type ratchet, i.e, one having a clockwise, a counterclockwise, and a null position of rotation. In one embodiment for construction of said mount arm application means an Armstrong locking ¾-inch drive male ratchet was heated about halfway between the ratchet means and the end of the handle provided therefore and bent to provide about a 15-degree angle from the normal attitude of said ratchet. A lever arm extension was welded to the back portion of the handle of said ratchet to provide an additional moment arm of about three or four feet. The resulting assembly was then arranged with the long end thereof essentially perpendicular to the length of member 1102 and in a manner for engaging the male drive spindle of the ratchet into aperture 1103 whereupon the resulting assembly was permanently joined by means of welding through the back side of member 1102 with a butting relationship of the terminus of said square cross-sectional male spindle. The requirement that the ratchet mechanism have a null or locked position between the clockwise and the counterclockwise drive direction will now be appreciated since the orientation of the resulting mechanism in a predisposed manner is desirable and necessary to ensure that the assembly including the square H assembly comprising 1101, the drive ratchet, and the three- or four-foot extension of the handle thereof are all properly aligned to accomplish both an assembly dimensioned to fit through the 16-inch-diameter manway and one that is properly orientated so that leading edge 1111 is in an attack mode for penetration of the higher elevated handle of nozzle dam 701, supra. Without this feature of a locking position, any manipulation of the assembly by means of the extension handle could cause rotation of member 1102 relative thereto and frustrate the penetration of leading edge 1111 into the aperture provided by said handle, supra. A small ring or other appropriate connecting means, not shown, is affixed to the ratchet drive selector such that after nozzle dam rotation tool 1101 is in place, engagement of said ring with a hook pole or like device can be utilized such that the ratchet mechanism will thereupon effectively rotate in the desired direction. In addition, it has been found that the mounting of a lifting eye on the back portion of the ratchet mechanism, also not shown, greatly facilitates rotation of the nozzle dam itself when said lifting eye is in operative engagement with the winch rope and clevis hook, not shown, and sufficient force is applied thereto to slightly raise the nozzle dam off of the nozzle holddown ring.

Referring now more specifically to FIGS. 13 and 14, there is shown a simplified side elevational view of the two embodiments of the bolt starting tool means utilized in the practice of the instant invention, usually after each occurrence of the nozzle dam and the nozzle dam center section, being properly translocated and angularly aligned respective to the nozzle holddown ring. As discussed elsewhere, the short version of the bolt starting tool as shown in FIG. 13 is generally utilized before the long version thereof as shown in FIG. 14, with this sequence being more a matter of convenience than necessity. Either bolt starting tool is passed through the open manway, supra, for engagement with the end therein inserted with the respective bolt heads and thereafter utilized to turn said bolts in a manner to free the threads thereof from the retaining clips so as to cause the bolt to drop through the remaining portion of the aperture near the periphery of the nozzle dam in which it is confined and, by means of its tapered end, into alignment with the threaded hole provided in the nozzle holddown ring. To ensure that at least a portion of the weight of the bolt starting tool is utilized in a manner to cause the bolts to drop through or seat into the respective apertures, it has been found to be convenient to utilize a pin inserted in or through the socket in a manner to effectively shorten the depth of the socket, i.e., the pin is caused to ride on top of the bolt head and exert a downward force thereon. Subsequent utilization of the bolt starting tool engages and rotates the respective bolts until they are in a "snug" fit. The end of the bolt starting tool which is still outside the open manway is adpated for connecting with drive means, usually a ⅜-inch heavy-duty electric motor, albeit, sometimes an air drive motor may be utilized.

Shown in FIGS. 13 and 14 are the approximate proportional relationships between the various fixed segments of the legs of each bolt starting tool and the angles maintained therebetween. Although not clearly evident from the depiction, the bolt starting tool generally comprises, through each leg thereof, an outer tubular member through which a drive shaft turns. The angles between any two adjoining leg portions can be fixed. In the earliest embodiment of the instant invention there was provided movable joints between and connecting each pair of adjacent leg portions and operatively connecting the drive shafts running therethrough by means of several universal joints, usually two. This arrangement allowed adjustment of the angles between the adjacent leg portions and also ensured that, in the event that one or more of the universal joints therebetween needed to be replaced, easy access thereto could be provided. In later embodiments of the bolt starting tool utilized in the practice of the instant invention, several units were built without the movable joint feature rather than the units as depicted in FIGS. 13 and 14. It should be pointed out, however, that the embodiment incorporated in the bolt starting tool means having the fixed angle universal joint arrangement just mentioned, lacks flexibility as it relates to providing suitable storage vessels for same, i.e., the units with the movable joints can be straightened out and stored as straight-line members, whereas those with fixed joints do not store as conveniently.

DESCRIPTION OF THE PREFERRED EMBODIMENT

A typical nuclear-powered steam generating system generally includes a reactor vessel serving each of four steam generating loops, respectively. Reactor cooling water, which has been heated to approximately 550° F. within the reactor, is circulated through the inverted U-tube bundle provided in each steam generator. Each steam generator has a feed water inlet and a steam outlet at its top.

The respective steam generators receive primary coolant water from the reactor via reactor coolant water outlet conduits, which conduits also serve as the primary water inlet conduits to each of these respective steam generators. As will be appreciated, the superheated primary water enters the steam generator via the channel head at its lower end and passes upwardly through all of the U-tubes in the tube bundle, entering and leaving via the downwardly facing open ends of the tubes which are respectively attached and pass through a tubesheet. A vertical divider wall within the channel head ensures that the flow of water is into one end of each tube and out from the other. The steam generator inlet conduits are sometimes referred to as the "hot legs" of the steam generation loops.

After the primary water heats the steam generator feed water (secondary water) which surrounds the tube bundle, thus generating superheated water for the later production of steam, the now cooler primary water leaves the steam generator via the steam generator outlet conduit or cold leg, which is also connected to the channel head. The water is conducted to the pump bowl or impeller casing of a main circulation pump, by which it is pumped back into the nuclear reactor. Thus, the steam generator outlet conduit may also be referred to as the inlet conduit to the pump. Such conduits are sometimes referred to as the "intermediate legs" of the steam generation loops, and the respective pump outlet conduits, which also serve as the reactor inlet conduits, are sometimes referred to as the "cold legs" of the loops. The diameters of these respective conduits are relatively large, being on the order of about 32 inches.

For purposes of describing the present invention, it will also be understood that the nuclear-powered steam generation system includes a pressurizer for maintaining the pressure of the primary coolant water within the system in excess of about 2000 psig, the lower end of the pressurizer tank being connected to the hot leg of one of the steam generation loops by a pressurizer line. The pressurizer is maintained about half-full of water, the remaining volume of the pressurizer tank being normally filled with saturated water vapor. For the normal drain-down procedure, the pressurizer tank has a nitrogen inlet at its top.

The common elevation of the hot legs of the steam generation loops is substantially the same as that of the respective cold legs. The intermediate legs include respective horizontally disposed portions at a common elevation, which is usually some several feet below the elevation just mentioned above, i.e., that of the hot and the cold legs. The horizontally disposed portions extend from 90-degree elbow portions which redirect the downwardly flowing water within the downwardly directed leg portions from the generators.

The nuclear-powered steam generation system also includes a chemical volume control system by which chemical additives are introduced for various purposes. It is through this system that the draining down of the entire reactor primary coolant water is conventionally conducted. Water drawn from the system via the drain line and level control line ordinarily passes through heat exchangers, flow orifices, and a volume control tank before it is returned via a charging pump to the system which connects to the cold leg of the loop. The chemical volume control system serves the entire reactor coolant system.

Such a steam generation system further includes a residual heat removal system. The residual heat removal system is operated only when the main circulation pumps are shut down, and when the reactant coolant water is being drained down from within the system. The residual heat removal system draws water from a hot leg of one of the steam generation loops via a suitable line. The water is pumped by residual heat removal pump(s) through heat exchanges, after which the cooled water is returned to the system via the cold legs of all four loops, the returning water entering these legs via the respective return lines. A portion of the water being removed during a drain-down initially leaves the system via the residual heat removal system.

When the reactor coolant water is to be drained down to or below the elevation of the hot-cold legs, steam is discharged via the steam outlets from all of the steam generators, and the respective loop circulating pumps are stopped. The residual heat removal pumps are started, and respective valves within the residual heat removal system are opened or closed, as the case may be, to divert the water, taken from the hot legs, into the chemical volume control system rather than to the return lines. Similarly, respective valves are either opened or closed, as the case may be, within the chemical volume control system to divert the water being taken from the system, as well as the water received from the system as aforesaid, to several holdup tanks, rather than to the volume control tank as would return the water to the system. Thus, all of the water draining from the system will be stored in the holdup tanks until it is to be returned to the system.

During this conventional drain-down, the system is depressurized and the water draining from within the pressurizer is replaced by nitrogen gas entering the pressurizer via the gas line at the top thereof. The level of the draining water is constantly monitored during the drain-down procedure, at first by the water level indicator on the pressurizer until the water has been almost emptied therefrom, and thereafter using the low-level monitoring system.

For a still more detailed description of such a typical nuclear-powered steam generating system see, for instance, FIG. 1 and attendant teachings in U.S. Pat. No. 4,649,019, Jawor, Mar. 10, 1987, the disclosures and teachings of which are hereby incorporated herein by means of reference thereto.

From a consideration of the above-described nuclear-powered steam generation system, it will be appreciated that oftentimes during a drain-down procedure of such a system it is necessary to secure the apertures comprising the steam generator inlet and outlet conduits. Accordingly, the presently commercial viable approach to effecting this procedure is to pass a folded nozzle dam through the manway formed in each half of the steam generator channel head, i.e., on each side of the vertical divider wall into the confines of each such half of the channel head followed by the ingress thereinto of a succession of human operators for man handling such inserted nozzle dam by the opening or unfolding thereof and the translocation onto the nozzle holddown ring comprising a terminus of such inlet or outlet steam generator conduit. The nozzle holddown ring is provided with bolt holes or other means for effecting the securing of the nozzle dam which has been moved thereover and properly orientated thereupon, it being understood that such nozzle dam is oftentimes provided with gasket means on the underside thereof to be sandwiched between the nozzle holddown ring and the nozzle dam. It is also understood that such nozzle dams are often constucted in a manner such that a substantial portion, usually in the form of a rectangle, thereof is "cut away" and machined in a manner so as to receive a solid center section. This manner of construction of the nozzle dam and said center section provides a more easily handled and manipulated configuration due principally to the lightening of the weight thereof by such cut-away section, but more importantly provides a convenient means for ensuring a more effective and positive seal than might be attained if such center section of said nozzle dam had not been cut away, which in such a configuration would present a discontinuity through the diameter thereof, it being further understood that both said nozzle holddown ring and said nozzle dam are in the preferred embodiments thereof in the form of circles. Since the handling of the nozzle dam and center section, together with the orientation of the nozzle dam onto the nozzle holddown ring for proper alignment of the bolt holes between the nozzle dam and the nozzle holddown ring, and also between such center section and such nozzle holddown ring, requires considerable time in terms of efforts of the human operator effecting same and further since the relatively high degree of radiation and radioactive contamination in such channel head presents both an adverse and hazardous environment, it is necessary that the time of stay within the channel head, the "jump time," by an operator be limited to no more than two to three minutes, and usually only about 30 seconds, since even such a relatively short time can effect a radiation dose equivalent to the standard three-month dose limit. Accordingly, after ingress of such an operator and set-up time by same together with his orientation relative to the tasks to be accomplished and further in consideration of the time which must be allotted for his discontinuing such tasks and effecting egress from such environment through the small manway, it will be appreciated that only a portion of the permissible jump time within such an environment is realized in relation to the performance of required tasks therein. Consequently, a substantial crew of operators may be required on stand-by basis for the introduction, translocation, orientation, and affixing of but a single nozzle dam. Since a single nuclear reactor, in such a system, usually serves four such steam generators and further since there is both an inlet and an outlet conduit in operative association with each such steam generator it is oftentimes necessary during such a draindown procedure to install no less than eight nozzle dams. In addition, after the requirement for such draindown procedure is satisfied such as, for example, by refueling the reactor and/or performances of maintenance on the system, the reverse procedure of removing each of the eight nozzle dams and the center sections in companion relationship therewith, must be effected before the system can be put back into operation. Therefore, there may be as many as 16 occurrences of crews entering through or jumping such manways and either placing and securing the respective nozzle dams or unsecuring and removing same. Note: As described herein, the nozzle dams are designed for use with companion relationship of center sections. It is to be understood, however, that the instant invention can be practiced with and on nozzle dams which are otherwise designed with no separable center sections and/or more than one break line. From a review of these considerations, it should be abundantly clear that the instant invention and the practice thereof which for the most part completely eliminates the heretofore necessary entering of the confines of such channel heads by human operators for performing the tasks, supra, effects a new, novel, and substantially improvement over the state of the art together with the attainment of significant health and safety advantages.

In the practice of the instant invention, specially designed tooling is utilized in the succession or sequence of steps which allows for the insertion of both the folded nozzle dam and its center section through the open manway and into each respective half of a typical steam generator in operative association with a nuclear reactor. The system of the instant invention provides for proper location and marking of a situs on the tubesheet for attachment thereto of means to which a winch rope or other lifting device may be secured and operatively connected to a situs located outside said channel head, but normally disposed within a few feet of an open manway. As perfected during the development of the instant invention, such lifting device may be associated with both the folded nozzle dam and, subsequently, the center section therefore, by means of suitable nozzle dam strapping means, whereby the insertion and passing of both the nozzle dam and center section is more easily facilitated through the manway and up into the confines of the channel head. Among the special tooling developed for practice of the instant invention is a tube marking pole for location of a situs on the tubesheet, and a tackle insertion tool adapted for inserting the tubesheet tackle through the manway for the affixing of same onto the tubesheet at such situs or for the removal therefrom. Other special designed tooling includes hook poles and mirror poles. There are also tools designed and used for coupling such tubesheet tackle means with the strapping means which in turn is attached to specific locations onto the folded nozzle dam, which dam has been placed on the inside bottom of said channel head. Subsequently, a number of steps are performed including either removing the tubesheet tackle means from the said situs on said tubesheet, and after marking another situs thereon, relocating and reattaching same to the tubesheet. Alternately, said first fixed tubesheet tackle means may be left in place and a second such tackle means may be introduced through the manway to said another situs for attachment to the tubesheet. In the later evolution of the practice found to be most desirable and efficient for effecting the present invention, it has been determined that instead of utilizing a tubesheet tackle at a situs first located above the manway in operative association with the rope lifting means and thereafter using the rope lifting means in conjunction with the tubesheet tackle mounted at a situs located generally above the nozzle holddown ring, it is now the recommended procedure to simply utilize one tubesheet tackle attached to the situs generally vertically above the center line of the nozzle holddown ring during movement of the various materials and tools into the channel head together with the subsequent translocation and securing thereof. It is noted, however, that in the reverse procedure of removing the nozzle dam and the center section from the channel head, said tubesheet tackle is predisposed in operative engagement with the tubesheet at a position generally above the center line of the manway.

The tubesheet tackle means generally comprises a plate usually about ¾-inch thick and in the form of a square or rectangle some four to six inches on the edge. Two tubesheet insertion pins are lined up and secured to the plate with a line through the center points thereof being parallel to an edge of said plate. A modified rapid installation tube gripper is also secured to or through said plate. The center points of said pins and gripper, in a planer view thereof, generally define a triangle with the center line or axis of said modified rapid insertion tube gripper being at an apex thereof. On the side of said plate opposite from which the insertion pins protrude is fixed an attachment means such as, for example, a ring which in turn supports a pulley mechanism. In the embodiment of the tubesheet tackle means employed in the full scale mockup for practice of the instant invention, a portion of said rapid insertion tube gripper extends through the plate and beyond the surface from which said attachment means extends. The modified rapid insertion tube gripper generally comprises a stem portion extending perpendicular to a major plane of the plate surface and in the same direction as the insertion pins and has a reverse tapered portion near the end thereof. A movable sleeve is provided over said stem portion, to extend over a substantial portion of the stem, and is provided with two apertures in the side wall thereof through which small steel balls such as, for example, ball bearings, protrude with that surface of said ball bearings generally located opposite from the portion protruding through said aperture generally riding on the upper reverse tapered portion of said stem. Said movable sleeve is provided with resilient means such as, for example, a spring near the top inner portion thereof for engagement with the end of the stem, which end extends slightly beyond said tapered portion. Said movable sleeve is also provided, juxtaposed its outer surface, with, at or near the end away from said resilient means, engagement means such as, for example, a flange and ring attached thereto. A plane through either edge of said ring is generally perpendicular to a major plane of said plate and also generally perpendicular to a plane through the center lines of said insertion pins. The terminus of said insertion pins and said movable sleeve which are located remote from said plate are tapered to facilitate entry thereto into tubes in said tubesheet. In addition, the outer diameter of said insertion pins as well as said movable sleeve are predetermined to be slightly less than the inner diameter of said tubes to which they are to be inserted. Thusly, upward pressure on the bottom side of said plate, i.e., that surface from which the attachment means protrudes vertically downward, causes insertion of the assembly into the appropriate tubes of the tubesheet. When the balls protruding from the movable sleeve engage the respective inner surface of the tube, into which the modified rapid insertion tube gripper is urged, they are caused to rotate and ride down the tapered portion of the stem, i.e., the taper thereof is such that the diameter of the stem is greater at the top than at the bottom, thereby allowing passage of said gripper into the tube. In a manner analogous to that set forth in the operation of a somewhat like device in Schukei, '472, supra, subsequent downward pressure on the plate such as, for example, a force vector applied to the attachment means on the bottom side thereof, causes said balls, in cooperation with said tapered portion of said stem, to be wedged against the inside surface of the respective tube. It has been determined that the device of the type just described can support upwards of about 250 pounds, which is more than adequate for the practice of the instant invention since the heaviest object to be supported thereby, to wit, the folded nozzle dam, weighs approximately 70 pounds. It should be appreciated that because of the alignment of such assembly and attachment of same to the tubesheet in relation to the action of the lifting device, later coupled thereto, that a horizontal force vector can be a viable consideration. Accordingly, said horizontal vector is balanced by means of the two insertion pins which are engaged within two other tubes on the tubesheet. This design has proved to be much more stable for the application of the various lifting and moving operations than the device described in Schukei, '472, supra. It will also be appreciated that this device must be positioned onto the tubesheet and into the respective tubes remotely from the second situs and through the open manway. Accordingly, a tubesheet tackle means insertion tool has now been devised for operative association therewith and generally comprises at the end or terminus thereof intended for coupling with such device, a U-shaped member having one leg of the U substantially longer than the other, each of said legs of said U comprising a plate, the major planes of which are generally horizontal in the intended mode of operation, with the bottommost plate being the substantially longer leg of said U and having a generally triangular-shaped opening therein with the base of such triangle or opening juxtaposed that edge of said lower plate which is most remote from the U-portion thereof. The apex of the triangle generally terminates at a distance away from said U-portion approximately equal to the length of the shorter leg. This cutaway portion is provided in said lower plate to allow the lower surface of the plate of said tubesheet tackle means to be born thereupon and the attachment means protruding therebeneath as well as the portion of the stem of said rapid insertion tube gripper to be received. The inner width of said U-portion is slightly larger than the thickness of the plate of said tubesheet tackle means for receiving at least a portion of the edge of said plate, which edge is that which is closest to said stem and parallel to a plane drawn through the center lines of said insertion pins. Fixed upon, or near, the upper surface of the plate defining said shorter leg of the U-assembly is ring engaging/disengaging means generally in the form of a movable pin which is operatively connected usually by wire or cable, to cable actuating means, usually a lever, located near the opposite end of said pole, whereby actuating of said lever causes extension or retraction, respectively, of a pin assembly or the like through the ring assembly which is attached near the lower region of said movable sleeve. When it is desired to disengage the tubesheet tackle means from the tubesheet, downward pressure exerted by the pin onto said ring means and thence through said movable sleeve causes said steel balls to begin travel down the reverse tapered portion of said stem and to be thereby retracted from engagement with the inside surface of the tube into which they are wedged.

As described, supra, the situs outside the channel head generally comprises a location to which the rope is attached to the winch. The winch stand in turn is affixed to the grating outside said channel head and at a convenient elevation therebelow. After operatively associating the lifting means with the mounted tubesheet tackle means, it is coupled with the still folded nozzle dam by means of the strapping means, which strapping means generally comprise a ring for attachment to both said lifting device and, usually three sets of two straps each, said sets being of different length, four of which straps in turn are normally coupled at specific locations on the nozzle dam by means of, preferably, scissor hooks operated with appropriate tooling, including a tackle hook pole. The subsequently actuating of such lifting device causes said nozzle dam to begin to be elevated whereupon the orientation thereon and the relationship thereto of the two, of the three utilized sets of straps, causes the unfolding of said nozzle dam. The continuing actuation of said lifting device and resulting further continued elevation of the nozzle dam effects the full opening thereof and the translocation of same from its inserted portion on the bottom wall of the channel head upwardly on such wall, it being understood that said wall comprises the inner surface of a portion of a sphere, until said nozzle dam is juxtaposed said nozzle holddown ring with the center points thereof being in about vertical alignment. In actuality, it will be appreciated that the horizontal displacement of the point comprising the intersection of the center line of the nozzle dam, and a plane across the top surface thereof; and the point comprising the intersection of the center line of the nozzle holddown ring, and a plane across the top of said ring are a function of both the angular displacement of said nozzle holddown ring from vertical and the thickness thereof. Accordingly, the positioning of the tubesheet tackle means at a situs thereabove is predetermined, with this consideration taken into account. Provisions are made in the retrofitting of the nozzle dam for a plurality of relatively short lip sections to extend downwardly beyond the bottom plane of said nozzle dam so as to ride over the outside of said nozzle holddown ring to further ensure that after the placement of said nozzle dam onto said nozzle holddown ring, the orientation thereof, which is effected by means of turning said nozzle dam angularly relative to said nozzle holddown ring, does not upset the necessary juxtapositioning therebetween. There are also provided on the upper surface of said nozzle dam a plurality of bolt holders each of which is adapted with threaded apertures such that each bolt associated with said nozzle dam and having a smooth section thereof, disposed between the head and the threaded section, can be backed out through the respective bolt holes into said threaded aperture in a manner such that the bottom end of each bolt, i.e., the end thereof opposite the bolt head, does not protrude beyond the bottom plane of said nozzle dam, thereby ensuring that said nozzle dam can be freely turned on said nozzle holddown ring. The turning or rotation of said nozzle dam in relationship to said nozzle holddown ring is accomplished by still further specially designed tooling which in one form thereof is in the form of a modified socket wrench with the socket portion, preferably 1⅛inch, permanently secured to the drive stem thereof and with the handle portion of said socket wrench provided with suitable extension handle means and configuration so as to provide for the insertion thereof through the open manway. This nozzle dam rotation tool means is operatively associated with said nozzle dam and attached transversely to the line of the nozzle dam fold and bridging between the two nozzle dam handle means, which handle means extend vertically upward from the top surface on each half of the nozzle dam and run generally parallel to said fold line. The nozzle dam rotation tool means is provided with engagement means normally in the general form of one or more hooks which extends over the outer edge of the nozzle dam handles and which are urged into engaging relationship therewith with modified pins or retaining clips which extend over the inside portions of said handles. The center section of said nozzle dam rotation tool means has accommodation therein of a square or hexagonally cross-sectioned aperture for engagement with the handle portion of said nozzle dam rotation tool. In addition, for ease in positioning and manipulation of such nozzle dam rotation tool, attachment thereof with said lifting means is preferred. Manipulation of the nozzle dam rotation tool, after removal of the ratchet selector from the null position, through the handle thereof by the operator standing at the open manway causes the ratcheting and turning of said nozzle dam until the proper orientation thereof is achieved relative to the nozzle holddown ring. It is important to note that this generally 90-degree rotation of the dam is inherently mandated in the operations of some of the systems comprising the instant invention, since it is necessary to first orientate the nozzle dam within the confines of the channel head in a manner such that attachment of the four straps thereto, comprising a portion of the nozzle dam lifting and/or support means, i.e., the strapping means, causes the two short straps in the one set thereof to first become taunt, i.e., the two long straps in the other set thereof are still slack, as the lifting means is first put into actuated mode. As noted, supra, the third set of straps comprising said strapping means, i.e., those of intermediate length, are used primarily for lifting and removing the nozzle dam off the nozzle holddown ring during removal of the dam from the channel head. As the lifting means continue to be actuated, these two short straps exert a generally upward vertical force vector and a relatively small horizontal force vector in the direction towards the nozzle holddown ring. As will be appreciated, the resultant force vector causes that half of the folded nozzle dam, attached to said short straps and on the side of the fold line in the direction of the nozzle holddown ring, to pull away from the other half of said nozzle dam and thusly begin the unfolding of this assembly. It will be further appreciated that the relationship between the relative connecting links of the set of short straps and the set of long straps, as well as the diameter of the nozzle dam, are critical to effecting a smooth and continuous unfolding of the nozzle dam assembly and thence the resulting translocation thereof, as said lifting means further continues in the actuating mode, up and over the curvilinear inside surface of the channel head and onto the nozzle holddown ring. Since the side of the nozzle holddown ring presents a slight discontinuity within said channel head, it will be further appreciated that the translocation of the dam assembly may need to be assisted with the prodding of hook pole means to cause it to ride up and over said discontinuity. After the full translocation of said nozzle dam onto said nozzle holddown ring it is thereafter necessary to employ the use of the nozzle dam rotation tool as described, supra, since the orientation of the nozzle dam is generally 90 degrees off from that required for proper alignment and subsequent securing to the nozzle holddown ring. Before so utilizing such nozzle dam rotation tool, it has been found expedient to first remove the strapping means from operative association with the nozzle dam means and the rope or first lifting means. It should be noted that this requirement for generally rotating the nozzle dam, after it is placed in companion relationship with the nozzle holddown ring, approximately 90 degress, is a requirement for the installations found at TVA's Sequoyah Nuclear Plant. At the installations found at TVA's Watts Bar Nuclear Plant, the prearrangement of the nozzle holddown ring in the bottom side wall of the respective channel heads and other design criteria only require that the nozzle dam be placed thereupon and perhaps angularly orientated just slightly to line up the apertures in the periphery in the nozzle dam with the companion bolt receiving holes in the nozzle holddown ring. Alignment of said nozzle dam in relation to said nozzle holddown ring may be determined by use of a video camera. In the early development of this invention, still another specially designed tool, in the form of a pole was used by inserting same through the open manway and manipulated by an operator outside thereof, and which had on the end thereof extending into the channel head a specially designed three-stage alignment pin orientated for insertion into the pin alignment aperture extending through the nozzle dam near the peripheral thereof and into the nozzle holddown ring. After said alignment pin is seated by means of said alignment pin tool or a video camera, and thusly the proper orientation between the nozzle dam and nozzle holddown ring is established, still another special piece of apparatus, known as the bolt starting tool, is inserted by an operator through the open manway and into engagement with a preselected bolt on said nozzle dam, it being understood, of course, that all the bolts thereon at this stage of sequencing are in a retracted position by means of their threads at or near the generally smooth or shank portion of said bolts being in operative engagement with each bolt holding means associated with each nozzle dam bolt hole. The bolt starting tool is generally configured as an open U-configuration, albeit, in one form thereof it is comprised of some four leg segments of generally unequal length but with the total of the angles between the first and second leg segment, the second and third leg segment, and the third and fourth leg segment ranging from about 90 degrees, more or less to about 120 degrees in the aggregate. A drive means extends throughout the length of said bolt starting tool and preferably through the tubular leg segments thereof, with universal type joining means between each of the respective sections and with said drive means terminating on that end of said bolt starting tool, adapted for coupling with the nozzle dam retracted bolts, being in the general form of a socket for engagement with such bolt heads. The other end of said drive means, i.e., that which terminates at or near the end of the bolt starting tool means manipulated by the operator, is preferably adapted for coupling with motorized drive means which drive means in one embodiment employed in the full scale mockup of the instant invention comprised a heavy duty ⅜-inch electric drill.

After the at least temporary securing of the nozzle dam means to the nozzle holddown ring by means of engagement of the bolt starting tool with one or more preselected and retracted bolts on such dam, the nozzle dam rotation tool must be disengaged or unlatched from its operative association with the handles thereon and removed from juxtaposition therewith in order to provide for the subsequent installation of the nozzle dam center section. Said center section is passed by one or more operators into the channel head through the open manway, with or without the aid of the lifting device. In any event, after said center section is inside the channel head, the lifting device is operatively connected between tubesheet tackle means and the two shorter straps of the strapping means, which are in turn operatively connected to the two handles on said center section by means of scissor hooks located at the bottom ends of said straps. These two handles on said center section extend vertically upward from the top surface thereof and generally run parallel to the nozzle dam fold line when said center section is in proper orientation with said nozzle dam. After actuation of the lifting means for a short time, the nozzle dam center section, now in operative copulation therewith, is caused to translocate to the previously properly positioned, and at least temporarily secured nozzle dam, whereupon insertion into the channel head of bolt starting tool means is utilized to engage one or more preselected and retracted bolts for at least a temporary securing of said center section to said nozzle holddown ring. Because of the limited angle of attack available through the manway and the prerequisite for orientation of the bolt engagement means with one end of the bolt starting tool and the respective bold heads, i.e., the center lines through such bolt engaging means and such bolts should be parallel and most preferably coincident with one another, it has been found that the instant invention can be more effectively practiced and the objectives of the system thereof attained by the use of two different size bolt starting tool means with the smaller one thereof being generally used for starting bolts closest to the manway and, of course, the larger thereof being used for starting bolts located furthest from the manway.

Subsequent to the at least temporary securing of the center section to the nozzle holddown ring, the various special tooling and apparatus is disengaged from the nozzle dam, the tubesheet, etc., and removed from the channel head. Subsequently, means are employed for the proper torquing of all of the bolts attendant the center section and the nozzle dam for securing closure of the aperture provided by the nozzle holddown ring. Said means for such proper torquing can be provided, in the preferred embodiment, by the use of robotistic torquing tool means which torquing means is also introduced into the channel head through the open manway, usually with the aid of the lifting means, supra. One such torquing means, which is available for commercial applications, is known as a Framatome Torquing machine, which after introduction into the channel head is properly orientated and translocated onto the center section of the nozzle dam means and upon activation such torquing means is preprogramed to locate, engage, and properly torque each bolt predisposed for affixing both the nozzle dam means and the center section thereto to the nozzle holddown ring means. Of course, after such torquing means has effected its intended predetermined pattern for securing all of the bolts, it is removed from the channel head, with the aid of the lifting means, by first removing it from juxtaposition with the nozzle dam center section and by proper manipulation of said lifting means in combination with a suitable grappling device such as a hook pole to move it across the floor of the channel head in the direction of the open manway from whence it is extracted. Subsequent to removal of the torquing means, the normal channel head work begins including eddy current determinations and tube plugging with the conduct of such work being independent of the raising of the system water level, i.e., the nozzle dam keeps water out of or prevents flooding of the channel head. Of course, after all test and/or maintenance work is performed in the channel head, the torquing means is reintroduced for unsecuring of the nozzle dam and it together with the nozzle dam and center section thereof is moved back across the confines of the channel head and removed through the open manway. Any other attendant equipment such as, for instance, the lifting device, is also removed. Subsequently, the tackle insertion tool is engaged with one or more of the tubesheet tackle means attached to the tubesheet for the removal of same from engagement with the tubesheet. When the channel head is finally cleared, the manway is closed and that particular channel head is ready for return to operation in the steam generation loop.

EXAMPLES

In order that those skilled in the art may better understand how the present invention can be practiced, the following examples are given by way of illustration only.

EXAMPLE I

In the early development of the instant invention, a tubesheet tackle device was employed which generally comprised a rapid installation tube gripper in a form modified from that shown in Schukei, et al., '472, supra, and was somewhat similar to the tubesheet tackle eventually utilized in the instant invention and shown in FIGS. 3 and 4; however, this earlier version, which incidentally was supplied by the assignee of Schukei, et al., utilized only one insertion pin in combination with the rapid installation tube gripper, both of which were mounted on a bearing plate. In addition, in this earlier employed device the pulley means was located in a position along the line between the insertion pin and the rapid installation tube gripper almost three-fourths of the distance therebetween. The holding power of this earlier device simply was not adequate to support either the weight of the folded nozzle dam alone, or the impulse vertical force vectors imparted thereto by the manipulation of the nozzle dam across the floor of the channel head. As it turned out, this earlier device was supplied by the manufacturer for purposes of supporting substantially lighter weight objects such as, for example, a nozzle holddown ring cover installation comprising a lightweight folding cover designed and intended for keeping objects from falling into the reactor cooling system via the 32-inch opening defined by the nozzle holddown ring. Also supplied by the manufacturer, along with this earlier version of a tubesheet mechanism, was an apparatus adapted for inserting the tackle through the manway and into operative engagement with the tubesheet, which apparatus comprised generally a pole with an angled member at the end thereof and having receptical means adapted for receiving the lowermost portion of the shaft member of the rapid installation tube gripper which protruded below the bottom surface of the bearing plate. In this manner, the tube gripper was to be inserted into the respective tube of the tubesheet in the manner taught by Schukei, et al. Although the insertion tool provided by the manufacturer may have been adequate for positioning, holding, and inserting a single rapid installation tube gripper, it proved to be less than adequate when attempts were made to use it for placing the first version of the tackle comprising such a tube gripper and a single insertion pin mounted on a bearing plate. The resulting assembly was not horizontally stable in the sense that the shaft member was free to rotate in said receptical means thereby making alignment of the insertion pins with its intended target tube very difficult. Also, the weight of the plate, the single insertion pin, and the moment arm induced by the weight thereof further tended to result in a combination which was unstable and difficult to manipulate for finding and inserting both the rapid installation tube gripper and the single insertion pin into the two respective target tubes of the tubesheet. Adding a second insertion pin and locating both of said insertion pins at generally the base of a triangle, defined by said two pins, and the rapid installation tube gripper and also the relocating of the pulley mechanism from a position close to the tube gripper to the present position shown in FIG. 4, to wit, below or near the line defined by a plane through both insertion pins, resulted in a substantial improvement thereover.

At this point, it was realized that a tackle insertion tool would have to be developed which would handle the modified tubesheet tackle and which would provide a combination therewith which could be relatively easily manipulated for positively locating and inserting into the three respective tubes of the tubesheet. The end result of solving this problem is the apparatus shown in FIGS. 5 and 6, supra. A principal factor contributing to the success of this new and improved tackle insertion tool is the feature of the engagement ring on the lower end of the movable sleeve for actuation of the wedging balls, rather than the use of the bottom flange as per the prior-art device.

EXAMPLE II

Once the problems of providing a suitable tubesheet tackle and a tackle insertion tool were overcome vis-a-vis the mechanism designed and utilized as described in Example I, above, it was necessary to design an assembly which could interact and couple with such tubesheet tackle and the folded nozzle dam so as to effectively unfold same, translocate the resulting unfolded dam across the bottom and lower side wall of the channel head, and at the same time hold the opened nozzle dam in an alignment and orientation approximating that presented by the nozzle holddown ring. This was accomplished by using the angle of the nozzle holddown ring and the height from the center of same to the tubesheet. The strapping lines were then extrapolated from the tubesheet focal point, i.e., generally the pulley attached to the bearing plate of the tubesheet tackle to the respective nozzle dam lugs, to find the lengths which were necessary to result in the proper angle for the suspended nozzle dam. At about this time, it was also determined that when the nozzle dam is to be installed that if the shorter straps are placed on the side toward the channel head peripheral and the longer straps on the opposite side thereof, i.e., the side toward the channel head vertical divider wall, that the resulting vertical force exerted upon such an assembly by the lifting device when the nozzle dam was to be lifted would effectively open the folded nozzle dam as described, supra. In the first embodiment of this strapping means only three straps, i.e., one long strap and two short straps, were utilized. This approach was found to be unsuitable since it did not provide enough stability to the resulting assembly. Since a commercially-available nozzle dam had only three provisions for hooking three such straps, it was decided that lifting lugs would have to be designed to fit onto the nozzle dam without effecting the structural integrity of the nozzle dam. The resulting modification was accomplished by adding a third and fourth alignment lug to the nozzle dam and mounting a lifting lug onto each of these added alignment lugs. As described, supra, the strapping means is comprised of six straps. For purposes of opening and moving the nozzle dam a set of two short straps, i.e., the 19-inch lengths and a set of two long straps, i.e., the 43-inch lengths, are utilized, the third set of straps, to wit, the two 25-inch lengths are normally not employed when opening, translocating, and placing the nozzle dam onto the nozzle holddown ring. This set of intermediate length 25-inch straps is employed, rather, in the lifting, translocating, and removing of the nozzle dam since the lengths of either the long straps or the short straps do not lend themselves to performing this function. The straps as presently utilized, are fabricated out of one-inch nylon strapping with a clevis hook, having a safety snap at one end thereof and a scissor hook at the other end thereof. In the early development of the strapping means, several different types of hooks were utilized, but all of those available were wrought with the difficulty of not allowing or providing for the remote removal or installation of the hooks onto the lifting lugs. Accordingly, the scissor hooks utilized in the present invention, as well as the clevis hooks, have been modified to provide for such removal and installation by means of adding to the scissor hooks a second opening ring located on the jaw opposite the jaw normally provided with a ring. In this manner, the proper manipulation of ends of certain of the hook poles can be used to wedge open the scissor hook. In the apparatus comprising the clevis hooks, this modification included the use of a tie wrap to hold the snap thereof in an open position such that when the clevis hook is urged into engagement with a lifting lug, or the like, the mechanism easily rides thereinto after which time the tie wrap is snagged and moved out of the way or removed therefrom, thereby providing for closure of this modified clevis hook apparatus by movement of the safety snap.

EXAMPLE III

In the first attempts to move the folded nozzle dam through the open manway into the channel head and thence across and onto the nozzle holddown ring, a first scheme employed a tubesheet tackle located vertically above the nozzle holddown ring. A rope, which passed through the manway and over a pulley on such tubesheet tackle, was passed back through the manway and connected to the folded nozzle dam. It was quickly found that pulling on the rope by hand required the use of considerable strength and; further, that the dam once inside the channel head could not be properly suspended, but rather precariously swung over and against the bottom of the channel head with the result of striking same with considerable force. Accordingly, the lifting device was first modified to include the use of a portable winch, which, winch, in turn is fastened to the steam generator grating. This arrangement overcame the requirement of employing excessive physical strength for hoisting and lifting the nozzle dam, but still resulted in the banging around of the nozzle dam inside the channel head unless the nozzle dam was temporarily secured by means of hook poles manipulated while the lifting device was being actuated, a most untenable situation. Accordingly, a second scheme of first utilizing a tubesheet tackle mounted at a situs in the general area vertically above the open manway, but slightly removed therefrom in a direction towards the nozzle holddown ring, was employed so as to ensure easy lifting and moving of the folded nozzle dam into the channel head and placement thereof onto the inner floor of the channel head in a gentle manner. In the later evolution of the practice found to be most desirable and efficient for the present invention, a third scheme wad devised in which the folded nozzle dam is simply inserted through the open manway. In this way, after the nozzle dam is placed within the channel head, the strapping means can be affixed and the lifting device attached to the situs which is generally located vertically above the nozzle holddown ring. The rope lifting means is in operative association with the tubesheet tackle mounted at a situs located generally above the nozzle holddown ring. It is noted, however, that in the reverse procedure for removing material such as the nozzle dam and the center section thereof, said tubesheet tackle is predisposed in operative engagement with the tubesheet at a position generally above the center line of the manway for the folding of the nozzle dam and translocation thereof away from the nozzle holddown ring and to the manway for subsequent removal through the manway. Of course, the center section of said nozzle dam has already been loosened from the nozzle dam and swung via the rope lifting means over to and out through the manway via the tubesheet tackle located thereover. The situs located outside the channel head comprises the general location of the winch and stand attached to the steam generator grating below and to one side of the open manway.

EXAMPLE IV

In the design of some steam generator channel head configurations, once the nozzle dam has been properly juxtaposed the nozzle holddown ring it needs to be rotated approximately 90 degrees, since it is originally in an orientation predetermined to effect the opening thereof from the folded position. It was therefore determined that a ratchet tool with a suitable moment arm could be utilized to turn the dam; however, since the nozzle dam weighs approximately 70 pounds, the weight thereof presented a substantial difficulty when it is realized that the operator must effect the movement of the other end of the ratchet tool or handle through the open manway. In addition, a bolt hole alignment problem was also encountered which was taken care of partially by the lips later provided on the periphery of the nozzle dam which have been referred to, supra, and which extend down over the periphery of the nozzle dam and ride over the periphery surface of at least a portion of the nozzle holddown ring. Since the juxtaposition of the nozzle dam with the nozzle holddown ring dictates an angular inclination of approximately 40 degrees, it will be appreciated that even with the use of the riding lips, supra, there may be a slight bolt hole misalignment. Accordingly, to solve this problem completely, the nozzle dam rotation tool which is referred to, supra, and which bridges the gap across the open cut of the nozzle dam for engagement with the handles on each side thereof, was modified by adding thereto a locking hook on the inside for engagement with the nozzle dam handles. It was found that once the nozzle dam rotation tool means was so modified, a slight upward urging of the nozzle dam by operative engagement of the lifting mechanism allowed the lifting of the nozzle dam off of the nozzle holddown ring just slightly, but sufficiently, to make rotation of the nozzle dam in relationship to the nozzle holddown ring considerably easier and also to ensure that the heretofore slight increment sliding down of the nozzle dam relative to the nozzle holddown ring was substantially eliminated to thereby ensure proper alignment of the bolt holes.

EXAMPLE V

After the nozzle dam was properly orientated relative to a position on the nozzle holddown ring by means of the modified nozzle dam rotation tool means, supra, it was first found necessary to redesign a bolt alignment tool intended for use in aligning the nozzle dam bolt holes with their respective apertures in the nozzle holddown ring. In the first design thereof, the pin was of a diameter which would fit into the apertures comprising the nozzle holddown ring bolt holes, but it was found that its diameter was too small to align the nozzle dam properly therewith. In other words, if the diameter of the bolt alignment pin was sufficiently small to fit within the apertures comprising the threaded holes of the nozzle holddown ring, it was too small to provide proper bushing in the slightly larger holes of the nozzle dam which were to be in companion relationship therewith. Accordingly, the alignment pin tool was redesigned such that the alignment pin comprised an apparatus of three different diameters in stepped relationship with the smallest thereof engaging the threaded receiving holes of the nozzle holddown ring, the second of which was slightly larger and closely fitted to the inside smooth bore of the nozzle dam holes which would be in companion relationship therewith, and the third and largest diameter being provided so that there would be square stock juxtaposed the nozzle dam center section alignment lip to interfere therewith. It was later determined that in operation of the instant invention, it was far more expeditious to use a mirror pole for determining the approximate alignment of the respective nozzle dam and holddown ring holes prior to final checking of same with the alignment pin tool; however, it should be appreciated that working with this type equipment requires constant compensation for the desired movement against the displayed mirror image. Accordingly, in the most recent embodiment for the practice of the instant invention, use of the alignment pin tool has been discarded with or without the attendant use of a mirror pole and an inspection procedure has been adapted utilizing a video camera which may be conveniently mounted on the tubesheet by means of a pneumatic-activated gripper which is provided by the camera supplier.

EXAMPLE VI

Once the nozzle dam is properly juxtaposed and orientated relative to the nozzle holddown ring and checked by means of employment of both the mirror pole and the alignment pin tool or more preferably with a video camera, it is necessary to begin engagement of the bolts which are provided in retracted position on the nozzle dam such that they may lock the nozzle dam to the nozzle holddown ring. Accordingly, it was necessary to devise and design a bolt starting tool for this purpose. In the first conception thereof, the bolt starting tool was constructed of one four-foot section and two two-foot sections that snapped together to form a socket extension which could be driven by means of a drill motor at the end thereof protruding through the open manway. This design provided that the end of the four-foot section which was furtherest removed from the drill motor would be further provided with a flexible shaft in operative engagement with a 1⅛-inch socket, which socket would ultimately engage the bolt heads. Accordingly, as the distance to be spanned from the manway to the various bolt heads above the nozzle holddown ring varied one or both of the two-foot sections could be removed or added thereto. This embodiment did not prove to be successful and in fact before a full prototype thereof was fabricated it was discarded. The final design of the present tool described generally, supra, and which comprises that shown in FIGS. 13 and 14, supra, employs two separate bolt starting tools which are referred to as the long tool and the short tool, both of which comprise straight sections of hollow tubing having fixed and/or movable joints at the intersections thereof and through which is passed a rotatable shaft such that actuation of the drill motor or other drive means, at the end protruding out through the manway causes rotation of the socket at the other end thereof. The junctures of the various sections comprising either fixed joints or movable joints are bridged by means of universal joints which connect the lengths of shafts moving within each of the hollow sections comprising such tool.

EXAMPLE VII

Once the nozzle dam bolt starting tool has effected at least a temporary securing of the nozzle dam through the nozzle holddown ring by means of actuating and placing the holddown bolts, the center section of the nozzle dam as described, supra, is placed in juxtaposition and proper alignment with the nozzle dam assembly. The commercially-available nozzle dam center section is provided with handles as also described, supra, which did not lend themselves to presenting the proper angle of attack when installing it remotely according to the practice and teachings of the instant invention. Accordingly, a spacer tab was located at about the center section of each handle of the two comprising the nozzle dam center section to ensure that each of the scissor hooks engage these handles and do not slide along the length of the handle to thereby cause the shifting of the angle of inclination thereof from that predetermined to be optimum.

EXAMPLE VIII

In the pursuit of further information gathered for the purpose of more clearly defining the parameters affecting the practice of the instant invention, the investigations herein were made to determine certain parameters and limits thereof for establishing proper guidelines for the practice of the instant invention. Accordingly, in this example there is set forth most of such parameters in the form of operating procedures. Note: This procedure was developed using the scheme wherein the tube sheet tackle is first mounted above the open manway, it being understood that, as noted above, the preferred and latest embodiment of the instant invention comprises a procedure wherein the nozzle dam and center section are moved into the channel head for securing to the nozzle holddown ring with the aid of a single tubesheet tackle located generally above the center section of said nozzle holddown ring, whereas the subsequent removal of the nozzle dam and its center section from the channel head and out through the manway is more effectively accomplished by the use of a single tubesheet tackle secured generally over the center line of the manway.

1.0 OBJECTIVE

This procedure details requirements for installation and removal of nozzle dams in the steam generator primary coolant nozzles.

2.0 TRAINING

Personnel shall receive documented training and mockup practice before performing nozzle dam installation or removal. The steam generator technical advisor is responsible for ensuring only trained personnel are utilized and for ensuring training adequacy.

3.0 EQUIPMENT 3.1 Manual Installation/Removal Equipment

A. Air operated screwdriver with ⅜-inch Bondhus Ball driver bit.
B. Nutsetter with 1⅛-inch socket.
C. Impact wrench with 1⅛-inch socket.
D. Nutsetter calibration fixture.
E. Speed wrench (optional).

3.2 Remote Installation/Removal Equipment

A. Tubesheet tackle, rope, and strapping means.
B. Winch and stand.
C. Tackle tool (one short, one long).
D. Nozzle dam rotation tool.
E. Alignment pin pole.
F. Mirror pole.
G. Bolt starting tool (one short, one long).
H. Drill, ⅜ inch with ⅜-inch socket adapter, for bolt starting tool.

I. Hook poles (2 each).
J. Tube marking pole.
K. Markers.
L. Tie down strap.
M. Camera(s).
N. Torquing Machine.

3.3 Other Equipment (Remote or Manual)
A. Prybar.
B. Leak detection system.
C. Nozzle dams (2 per steam generator)
D. Light.
E. Drain plugs (2 per steam generator) with ¼-inch ratchet.
F. Hydrotest fixture.
G. Brushes, ¾-inch-diameter stainless steel (as required).
H. Temporary nozzle covers (as needed).
I. Lubricant.
J. Air wrench lubricant.
K. Vent hole plugging equipment, consisting of
 1. Vent hole plugs.
 2. Ratchet, ⅜-inch drive with ⅜-inch socket.
 3. Tap, ⅜-inch pipe thread (NPT) with slide T-handle.
L. Air manifold with
 1. ½ inch by 25 feet (min.) air hose with perfecting 3D fittings.
 2. ½ inch by 25 feet (min.) air hose with perfecting 4D fittings.

4.0 HYDROTEST
Hydrotest nozzle dams prior to each usage, using test fixture provided by the steam generator technical advisor. Starting test pressure shall be 26 to 28 psig. Dams shall be installed with a minimum of every other bolt fastened to 150 to 200 ft-lbs. ACCEPTANCE CRITERIA: Pressure loss of no more than two psig in five minutes (seepage is allowable).

5.0 NOZZLE DAM INSTALLATION
NOTES:
Checkoff blocks are provided for hot (H) and cold (C) leg dams as indicated.

Steps may be worked out of the sequence suggested at discretion of the steam generator technical advisor and provided that intent of the instruction is not changed.

Remote and manual steps may be cross-utilized if certain steps are more easily performed with another method and AS LOW AS REASONABLY ACHIEVABLE (ALARA) considerations dictate.

When specific tools are called out, equivalent tools or means may be employed provided the intended function is performed.

Steps not required may be marked "N/A" (not applicable).

Tubesheet tackle locations, when specified, are optional.

5.1 Initial Actions
NOTE:
Lights and cameras may be removed and reinstalled during work performance.
 1. INSERT lighting and cameras as required.
NOTE:
Steps 2 and 3 below only apply for the first installation of nozzle dams for each unit and should be performed by the steam generator technical advisor (or his designee).
 2. PERFORM a visual inspection of holddown ring to check for ring orientation, weld buildup, open vent holes, or other abnormal conditions as follows:
  a. DETERMINE ring orientation. [A normal ring will have 12:00 at the top. A rotated ring should have 12:00 to the left (as viewed from divider plate)]; and RECORD results.
  b. CHECK for open vent holes (a vent hole is considered open if an open hole extends from ring I.D. to O.D.); and RECORD results.
  c. RECORD other conditions which could impair installation or sealing capabilities (such as excessive weld buildup).
NOTES:
Steps 3 and 4 below may be worked together if necessary. Open vent holes discovered after dam installation may be plugged even when leaking, without draining down or removing dam.
 3. PLUG open vent holes (if required) as follows:
  a. INSTALL nozzle covers, and TAP vent hole (⅜-inch pipe thread) if required.
  b. INSTALL vent hole plug by threading into hole; and TIGHTEN until the plug shears.
  c. REMOVE remainder of plug from steam generator.
  d. REMOVE nozzle covers.
 4. CLEAN (as necessary) holddown ring and bolt holes as follows:
  a. INSTALL nozzle covers.
  b. BRUSH bolt holes with a stainless steel wire brush.
  c. REMOVE debris and nozzle covers.
 5. VERIFY the following prior to nozzle dam installation:
  A. Accessible surfaces are free of abnormalities.
  B. Holddown bolts are lubricated (as required) and thread freely through retaining blocks (chase threads as required).
  C. Holddown bolts are threaded back into retaining blocks (except numbers 6 and 16) or as otherwise directed by the steam generator technical advisor.
  D. Retaining blocks move freely on cover surface but without excessive vertical movement while held in place with shoulder bolts.
  E. Belleville washers intact and positioned two per bolt with convex sides facing.
  F. All handles are firmly attached with slotted brackets firmly attached to center section handles.
  G. All hinges and lifting lugs are functional and secure.
  H. Alignment lugs are intact (4) and adjusted to the position specified by the steam generator technical advisor.
  I. Bolts connecting center section handles are secure.
  J. Torquing machine retaining pins are secure.
  K. All other parts are in place and functional.
  L. Gasket is firmly bonded to dam except within one to five inches of each inside straight edge and within hinge area (stretched cement is considered unbonded). Gasket separation is permitted within ½ inch of outside diameter.
  M. Gasket is free of large cuts, cracks, and ply separations, particularly at fold lines and around bolt holes.
 6. PERFORM a preinstallation functional test of tools and equipment to verify operability, correct rotation direction, condition of parts, and/or other critical parameters.
 7. OBTAIN the following approvals prior to hot leg nozzle dam installation to ensure adequate reactor coolant system (RCS) hot leg ventialtion will still exist after installing the hot leg dam to prevent pressurization of the reactor vessel (R.V.) upper plenum, and VERIFY administrative controls exist to prevent closure of vent path without providing an alternate vent path.

8. ENSURE all nozzle dam materials that contact reactor coolant are approved.

5.2 Remote Installation

1. SETUP winch stand and fasten to grating in a location such that manway is not obstructed by rope.

2. LOCATE correct tubes for marking (R24C31, and R20C68, or as directed by the steam generator technical advisor), and MARK with approved marker (preferably pink).

3. MARK on clad or side of nozzle holddown ring adjacent to a known bolt hole to aid in nozzle dam alignment (this mark should be visible from the manway), and MARK corresponding nozzle dam bolt.

4. REMOVE tubesheet camera if desired.

5. FASTEN folded section together using tie down strap.

6. POSITION nozzle dam on platform so that red arrows point away from manway.

7. HOOKUP installation straps (one per lug) as follows:

a. HOOK long straps to side of dam that will be next to the divider plate.

b. HOOK short straps to periphery side of nozzle dam.

c. SECURE remaining ends of straps to D-ring on winch rope.

WARNING: If not installed securely, tackle may fall and cause personnel injury.

8. INSTALL tubesheet tackle into tubesheet above manway (if desired) using appropriate tackle tool.

9. HOIST nozzle dam through steam generator manway (use winch as necessary).

10. BACK bolts 6 and 16 into retaining clips if necessary.

11. MOVE tubesheet tackle to premarked tube location over nozzle, (or other location if directed by the steam generator technical advisor) using appropriate tackle tool.

12. REMOVE tie down strap.

13. HOIST nozzle dam over nozzle holddown ring using winch, and

REST on ring, THEN

ENSURE nozzle dam is seated properly on ring.

14. REMOVE scissor hooks from lifting lugs using hooked pole, and

PULL straps out of manway, THEN

REMOVE D-ring and strapping means from winch rope.

15. SNAP winch rope hook to eye on nozzle dam rotation tool, and

INSTALL nozzle dam rotation tool between the two nozzle dam handles.

16. MANIPULATE latch on nozzle dam rotation tool over nozzle dam handle (to lock nozzle dam rotation tool to handle) using hook pole.

17. APPLY slight upward pressure to nozzle dam rotation tool using winch, and

HOLD pressure until alignment pin is installed.

NOTE: If divider plate is to the left when viewing from manway, nozzle dam should be rotated approximately 90 degrees counterclockwise. If divider plate is to the right when viewing from manway, nozzle dam should be rotated approximately 90 degrees clockwise.

18. ROTATE nozzle dam until premarked bolt hole is lined up with corresponding nozzle dam bolt, and ADJUST dam until proper alignment is obtained.

19. INSTALL alignment pin tool in lower center portion of nozzle dam.

CAUTION: Bolt starting tool must be set for proper rotational direction.

20. START bolts 13, 9, 3, and 19 in any sequence using bolt starting tool (other bolts may be substituted with permission of the steam generator technical advisor), and

RECORD.

21. REMOVE alignment pin and nozzle dam rotation tool.

22. SNAP straps (19 or 25 inch) to winch rope hook.

23. INSTALL nozzle dam center section approximately halfway through manway with red arrow pointed inward toward nozzle.

24. ATTACH strap scissor hooks to nozzle dam center section handles.

25. HOIST center section into steam generator using winch.

26. GUIDE center section into place using appropriate hook pole. It is preferable to align arrows on center section with arrows on folding section.

CAUTION: Bolt starting tool must be set for proper rotational direction.

27. START bolt No. 1 (or other bolt at steam generator technical advisors discretion) using large bolt starting tool, and

RECORD.

28. REMOVE scissor hooks from center section handles, and

PULL straps out of manway.

CAUTION: Only trained operators should be allowed to operate Torquing machine.

NOTE: "Impulse" torque readings during Torquing machine adjustment, characterized by a jump in torque at the high end, are a phenomenon associated with the torque analyzer and do not happen in the steam generator. Impulse readings may be discarded at the discretion of the trained Torquing machine operator.

29. SETUP Torquing machine on torque analyzer, THEN ADJUST pressure until three consecutive torque readings are between 150 and 200 ft-lbs, and RECORD.

30. MOVE tubesheet tackle to position over manway if desired.

31. PLACE a scissor hook on the winch rope hook, and

FASTEN scissor hook to foremost lifting lug on head of Torquing machine.

CAUTION: Pulling on Torquing machine umbilical cable can damage cables and connectors.

32. HOIST Torquing machine into steam generator using winch.

33. MOVE tubesheet tackle to position over nozzle (if previously moved), THEN

GUIDE Torquing machine carefully in place on center section of nozzle dam (use hook pole if necessary).

34. ACTIVATE pneumatic lock at console once Torquing machine is in place, and

REMOVE scissor hook from lifting lug, THEN

SECURE winch rope so Torquing machine can rotate freely.

CAUTION: Equipment must be set for proper rotational direction.

NOTE: IF a bolt cannot be fully inserted, threaded, or torqued for any reason, notify the steam generator technical advisor and continue with the next one. Although the nozzle dam is typically installed with all twenty bolts torqued, only every other one is needed for proper installation. Any nonadjacent bolts may be left untorqued at the discretion of the steam generator technical advisor. Any such bolts should be recorded.

35. START remaining holddown bolts using Torquing machine (or bolt starting tool if necessary), and
RECORD. (No sequence specified.)

36. TORQUE holddown bolts to 150 to 200 ft-lbs in the sequence shown; and
RECORD.

37. REMOVE scissor hook from hook on winch rope.

38. FASTEN winch rope hook to foremost lifting lug on Torquing machine using hook pole.

39. DEACTIVATE pneumatic lock at console (if lock fails to operate, it can be manually unlocked using a hook pole).

CAUTION: Pulling on Torquing machine umbilical cable can damage cables and connectors.

NOTE: If desired, the tubesheet tackle may be moved to facilitate Torquing machine removal.

40. LIFT the Torquing machine using the winch and guide out of manway (use hook pole if necessary).

41. SETUP Torquing machine on torque analyzer, and ENSURE Torquing machine is still functional, and RECORD.

42. REMOVE tubesheet tackle using tackle tool.

CAUTION: DO NOT OVERTIGHTEN DRAIN PLUG.

NOTE: The next step must be coordinated with Radiological Control Group (RAD-CON).

43. INSERT drain plug in drain hole in bottom of channel head, and
TIGHTEN, THEN
PULL to verify tightness, and
RETIGHTEN if necessary.

5.3 Manual Installation

NOTE: Only trained nutsetter system operators should perform steps 1 and 2 below.

1. SET nutsetter low pressure alarm at approximately 150 ft-lbs.

WARNING: Stall bar on nutsetter can inflict serious damage by crushing hands. Keep clear of bar when operating nutsetter.

2. SETUP nutsetter on torque fixture, THEN
ADJUST air supply pressure until three consecutive torque readings are obtained between 150 and 200 ft-lbs, THEN
RECORD.

3. INSERT nozzle dam folding section through manway, and
INSTALL dam onto nozzle holddown ring (preferably with arrows pointing up or to left if ring is rotated).

4. ADJUST dam until visible holes line up with ring holes, and
LOOSEN retaining clips, if necessary, to allow dam to align.

NOTE: If a bolt cannot be fully inserted, threaded, or torqued for any reason, notify the steam generator technical advisor and continue with next one. Although nozzle dam is typically installed with all twenty bolts torqued, only every other one is needed for proper installation. Any nonadjacent bolts may be left untorqued at discretion of the steam generator technical advisor. Any such bolts should be recorded.

5. START but do not tighten as many bolts as possible using a speed wrench or air operated screwdriver (it is recommended that four corner bolts (3, 9, 13 and 19) be started first), and
RECORD.

6. INSTALL center section of dam (preferably with arrow in same direction as arrows on folding section), and
ALIGN holes.

7. START but do not tighten as many center section bolts as possible using a speed wrench or air operated screwdriver, and
RECORD.

NOTE: If low pressure alarms activates, bolts should be retorqued.

8. TIGHTEN all bolts with nutsetter, preferably starting with bolt No. 1 and proceeding clockwise, and
ALLOW nutsetter to stall to obtain proper torque, and
RECORD.

CAUTION: DO NOT OVERTIGHTEN DRAIN PLUG.

NOTE: The next step must be coordinated with RAD-CON.

9. INSERT drain plug in drain hole in bottom of channel head, and
TIGHTEN, THEN
PULL to verify tightness, and
RETIGHTEN if necessary.

10. SETUP nutsetter on torque fixture, and
ENSURE nutsetter is still functional, and
RECORD.

5.4 Leak Detection System

NOTE: Step 1 below should be performed without connecting power to the system and without inserting the probe/suction header into steam generator.

1. CONNECT leak detection system as directed by the steam generator technical advisor, THEN
SECURE cables to suction hose, and
SECURE hose connectors with tape, tiewraps, or equivalent.

2. ENSURE all switches on console box are OFF, and
ENSURE toggle switches in sump pump box are DOWN.

NOTE: Siren may trigger if probe/suction header is laid on its side.

3. ENSURE probe/suction headers are in the upright position (not in steam generator), THEN
PLUG console box power cord to 110 Vac.

NOTE: The following steps refer to switches/lights on console box.

4. TURN main power switch ON, THEN
ENSURE pump power light comes on.

5. TURN console power switch ON, THEN
ENSURE console power light comes on.

6. DEPRESS pump reset button, THEN
ENSURE pumps are not running.

7. TEST pump alert siren
  a. PLACE pump alert switch in TEST position.
  b. VERIFY low volume tone.
  c. RETURN pump alert switch to ON position.

8. TEST flood alert siren
a. PLACE flood alert switch in TEST position.
b. VERIFY 120 dB siren.
c. RETURN flood alert switch to ON position.
9. TEST hot leg pump
a. PLACE hot leg pump switch in RUN position.
b. VERIFY hot leg pump alert light (yellow) and ammeter (should read approximately four amps).
c. RETURN hot leg pump switch to OFF position.
d. DEPRESS pump reset button (ammeter should return to zero).
10. TEST cold leg pump.
a. PLACE cold leg pump switch in RUN position.
b. VERIFY cold leg pump alert light (yellow) and ammeter (should read approximately four amps).
c. RETURN cold leg pump switch to OFF position.
d. DEPRESS pump reset button (ammeter should return to zero).
11. TEST hot leg system.
a. TRIP hot leg level switch by tilting probe/suction header until contact opens.
b. VERIFY the green level switch light goes out, the yellow hot leg pump alert light comes on, and the ammeter indicates approximately 4 amps.
c. VERIFY hot leg pump is activated and pump alert siren sounds.
d. LEAVE probe tilted for approximately five minutes, and
VERIFY flood alert siren sounds and red flood alert light comes on.
e. SET probe back into upright position, and
ENSURE flood alert siren and light go off.
f. ENSURE hot leg pump continues to run for approximately 30–45 seconds and then shuts off.
g. ENSURE hot leg pump alert light goes off, green level switch light comes on, and ammeter returns to zero.
12. TEST cold leg system.
a. TRIP cold leg level switch by tilting probe/suction header until contact opens.
b. VERIFY the green level switch light goes out, the yellow cold leg pump alert light comes on, and the ammeter indicates approximately 4 amps.
c. VERIFY cold leg pump is activated and pump alert siren sounds.
d. LEAVE probe tilted for approximately five minutes and,
VERIFY flood alert siren sounds and red flood alert light comes on.
e. SET probe back into upright position, and
ENSURE flood alert siren and light go off.
f. ENSURE cold leg pump continues to run for approximately 30–45 seconds and then shuts off.
g. ENSURE cold leg pump alert light goes off, green level switch light comes on, and ammeter returns to zero.
13. VERIFY audio alerts are operational.
a. SWITCH pump alert switch to TEST, and
VERIFY high pitch whistle.
b. SWITCH pump alert to ON.
c. SWITCH flood alert switch to TEST, and
VERIFY 120 dB siren.
NOTES: Hose/cable should be secured to provide support but sufficient slack should be maintained to allow for movement. The suction header may be removed temporarily during other steam generator work activities provided the probe/suction header is placed upright to prevent a false alarm.

14. INSTALL probe/suction header assembly into steam generator with probe in bottom of bowl.
15. ENSURE switches and lights are in the proper configuration.
16. VERIFY dams are properly installed and leak detection system is operational, THEN
NOTES: Leakage is indicated by operation of the pump. Leakage is acceptable provided the pump can keep up with the leakage. If the pump can not keep up as indicated by the pump running for five minutes continuously, the flood alert siren will sound. The second pump may be utilized if necessary but personnel should be evacuated from channel head and unit operator notified. Notify steam generator technical advisor of leakage.
17. MONITOR leak detection system during and immediately following reactor cavity flooding to determine if any nozzle dam or drain plug leakage has occurred, and
NOTIFY ASOS/SRO of status.
18. MONITOR leak detection system whenever water is behind dams at least once per 12-hour shift (or as directed by the steam generator technical advisor) by verifying switch and light positions or by visual inspection of the steam generator channel head if probes are removed, and
RECORD.

6.0 NOZZLE DAM REMOVAL
6.1 Initial Actions
NOTES:
Nozzle dams are removed after the RCS has been drained to mid loop.
It is preferable to remove the hot leg dam prior to the cold leg dam.
1. OBTAIN approval to remove dams.
2. TURN console box main power switch OFF, THEN
REMOVE suction headers from steam generator.
3. LOOSEN and REMOVE drain plug from channel head.
IF no water leaks in through drain hole, THEN loop is adequately drained and nozzle dam may be removed, OTHERWISE
REINSTALL drain plug and suction header, and
NOTIFY Assistant Shift Operations Supervisor/Senior Reactor Operator (ASOS/SRO) to drain loop further.
NOTES: It is useful to allow several minutes to elapse between removal of the drain plug and attempting removal of the folding cover when working in the cold leg. This allows any low pressure caused by draining the loop to dissipate. A pry bar may be necessary to break the cover loose from the ring. Recommended prying spots are the four retaining clips and the two hinge support plate extensions. Do not pry on the hinges themselves or the hinge hardware.

6.2 Remote Removal
1. INSTALL tubesheet tackle over nozzle in previously marked holes (or other location if directed by the steam generator technical advisor) using appropriate tackle tool.
2. REINSTALL Torquing machine.
NOTE: Only trained Torquing machine operators should use the Torquing machine.
3. LOOSEN all nozzle dam holddown bolts, ensuring (to the best of the operators ability) that all bolts are out of holddown ring.
4. REMOVE Torquing machine.

5. REMOVE tubesheet tackle, and
REINSTALL over manway using appropriate tackle tool.

6. THREAD rope through closest nozzle dam center section handle using suitable hook pole, and
SNAP hook onto rope.

7. HOIST center section of nozzle dam to manway, using winch and suitable hook pole, and
REMOVE center section from steam generator.

8. FASTEN two 25-inch straps to winch rope hook.

9. PULL tie wrap (or equivalent) over safety latch on one of the hooks.

10. ATTACH hooks to nozzle dam removal lugs using hook pole,
THEN
MOVE tie wrap until safety latch engages.
WARNING: Nozzle dam will swing free and may cause injury.

11. HOIST nozzle dam to manway using winch.

12. SECURE folded section of nozzle dam together (if desired) using tie down strap.

13. REMOVE nozzle dam from steam generator.
WARNING: Tackle may fall when released.

14. REMOVE tubesheet tackle using tackle tool.

15. VERIFY nozzle dam assembly is complete and seal adhesive is removed from the steam generator.

6.3 Manual Removal

1. LOOSEN all bolts with impact wrench.
2. REMOVE center section from steam generator.
3. REMOVE folding section from steam generator.
4. VERIFY nozzle dam assembly is complete and seal adhesive is removed from the steam generator.

While we have shown and described particular embodiments of our invention, modifications and variations thereof will occur to those skilled in the art. We wish it to be understood, therefore, that the appended claims are intended to cover such modifications and variations which are within the true spirit and scope of our invention.

What we claim as new and desire to secure by Letters Patent of the United States is:

1. A nozzle dam translocating system for remotely relocating nozzle dam means from outside the confines of nuclear reactor steam generator channel head means to coupled association with nozzle holddown ring means within the confines of said channel head means and for the converse thereof to thereby substantially minimize personnel exposure to radiation and/or radioactive contamination environment within said channel head means, said system comprising:

(a) nuclear reactor steam generator channel head means having manway means and nozzle holddown ring means provided on the lower wall thereof, and tubesheet means generally defining a horizontal plane comprising the upper boundary thereof;

(b) tubesheet tackle means adapted for remote location and attachment to a first predetermined situs, said first predetermined situs disposed on said tubesheet means;

(c) lifting means adapted for operative association with both said tubesheet tackle means and a second predetermined situs, said second situs located outside the confines of said channel head means;

(d) nozzle dam means adapted in folded mode for introduction through said manway means and into said channel head means;

(f) nozzle dam strapping means adapted for securing to said nozzle dam means either prior or subsequent to introduction thereof through said open manway means and into said channel head means, and further adapted for coupling with said lifting means and said tubesheet tackle means, whereby subsequent actuating of said lifting means elevates said folded nozzle dam means adapted in folded mode to effect the unfolding thereof to the full open position and the continued actuating of said lifting means translocates said fully opened nozzle dam means until the center point thereof is substantially vertically disposed over the center point of said nozzle holddown ring means and in juxtaposition therewith;

(g) remote determination orientation means adapted for inspection and/or adjustment of said nozzle dam means relative to the angular rotation, or the horizontal vector displacement, or both, of said nozzle dam means relative to said nozzle holddown ring means;

(h) bolt starting tool means adapted for remotely securing, at least temporarily, said nozzle dam means and later mentioned nozzle dam center section means, to said nozzle holddown ring means;

(i) nozzle dam center section means adapted for introduction through said manway means and into said channel head means and further adapted for remote operative association with at least a portion of said nozzle dam strapping means whereby coupling of said nozzle dam strapping means with said lifting means and the subsequent actuating thereof effects positioning and engagement of said center section means with said nozzle dam means; and (j) torquing means adapted for securing said nozzle dam means to said nozzle holddown ring and said nozzle dam center section to said nozzle holddown ring.

2. The nozzle dam translocating system of claim 1 in combination with nozzle dam remote rotation means adapted for engagement with said nozzle dam means and for effecting angularly movement thereof, relative to said nozzle holddown ring means in juxtaposition therewith.

3. The nozzle dam translocating system of claim 1 wherein said first determined situs is generally vertically above about the center point of said nozzle holddown ring means.

4. The nozzle dam translocating system of claim 1 wherein said nozzle dam means is coupled with said lifting means in operative association with tubesheet tackle means attached to said tubesheet at a third situs, said third situs generally located vertically above the center line of said manway means for introducing said nozzle dam means in folded mode through said manway means and into said channel head means.

5. The nozzle dam translocating system of claim 1 in combination with tackle insertion tool means for introduction through said manway means and into said channel head means of said nozzle dam tubesheet tackle means.

6. The nozzle dam translocating system of claim 1 in combination with alignment pin tool means for remotely effecting a determination of the proper orientation of said nozzle dam means in relation to said nozzle holddown ring means.

7. The nozzle dam translocating system of claim 1 in combination with tubesheet mounted video camera means for remotely effecting a determination of the proper orientation of said nozzle dam means in relation to said nozzle holddown ring means.

8. The nozzle dam translocating system of claim 1 in combination with hook pole means for remote operative association of said nozzle dam center section means with at least a portion of said nozzle dam strapping means.

9. The nozzle dam translocating system of claim 1 in combination with hook pole means for remote operative association of said nozzle dam strapping means with said lifting means.

* * * * *